United States Patent
Homma

(10) Patent No.: US 10,187,575 B2
(45) Date of Patent: Jan. 22, 2019

(54) IMAGE ACQUISITION APPARATUS, METHOD OF CONTROLLING IMAGE ACQUISITION APPARATUS, COMPUTER-READABLE RECORDING MEDIUM NON-TRANSITORILY STORING CONTROL PROGRAM OF IMAGE ACQUISITION APPARATUS, AND IMAGE ACQUISITION SYSTEM

(71) Applicant: Olympus Corporation, Shibuya-ku, Tokyo (JP)

(72) Inventor: Shinsuke Homma, Hino (JP)

(73) Assignee: Olympus Corporation, Tokyo (JP)

( * ) Notice: Subject to any disclaimer, the term of this patent is extended or adjusted under 35 U.S.C. 154(b) by 560 days.

(21) Appl. No.: 14/801,249

(22) Filed: Jul. 16, 2015

(65) Prior Publication Data
US 2016/0065849 A1    Mar. 3, 2016

(30) Foreign Application Priority Data

Aug. 27, 2014 (JP) .................................. 2014-172779

(51) Int. Cl.
H04N 5/225  (2006.01)
H04N 5/247  (2006.01)
H04N 5/232  (2006.01)

(52) U.S. Cl.
CPC ......... *H04N 5/23293* (2013.01); *H04N 5/232* (2013.01); *H04N 5/23203* (2013.01);
(Continued)

(58) Field of Classification Search
None
See application file for complete search history.

(56) References Cited

U.S. PATENT DOCUMENTS 8,259,186 B2 * 9/2012 Kiyoshige .......... H04N 1/00413
348/211.99
8,687,088 B2 * 4/2014 Morita .................. H04N 5/765
348/231.2

(Continued)

FOREIGN PATENT DOCUMENTS

JP           7-240868           9/1995

*Primary Examiner* — William C Vaughn, Jr.
*Assistant Examiner* — Lindsay J Uhl
(74) *Attorney, Agent, or Firm* — John C. Pokotylo; Pokotylo Patent Services

(57) ABSTRACT

An image acquisition apparatus includes a display unit configured to display first display images corresponding to first sequential images generated by an imager unit by imaging simultaneously with second display images corresponding to range specifying sequential images received by a communication unit from at least another image acquisition apparatus, the range specifying sequential images respectively corresponding to second sequential images generated by imaging and being smaller in communication amount than the second sequential images. The image acquisition apparatus further includes an operation unit configured to receive a specified range which is a range in the second sequential images specified by a user operation based on the second display image displayed on the display unit, and a controller unit configured to cause the communication unit to receive the second sequential images including at least the specified range.

18 Claims, 18 Drawing Sheets

(52) U.S. Cl.
CPC ......... *H04N 5/23206* (2013.01); *H04N 5/247* (2013.01); *H04N 5/2259* (2013.01)

(56) References Cited

U.S. PATENT DOCUMENTS

| | | | | |
|---|---|---|---|---|
| 9,019,383 | B2* | 4/2015 | Jung | H04N 1/00137 348/207.1 |
| 9,113,068 | B1* | 8/2015 | Whitson | H04N 5/23206 |
| 9,288,532 | B2* | 3/2016 | Cheon | G06F 17/30026 |
| 2007/0201864 | A1* | 8/2007 | Shinkai | G11B 27/034 396/429 |
| 2008/0244066 | A1* | 10/2008 | Yoshida | G03B 15/08 709/224 |
| 2014/0160304 | A1* | 6/2014 | Galor | H04N 5/232 348/207.1 |

\* cited by examiner

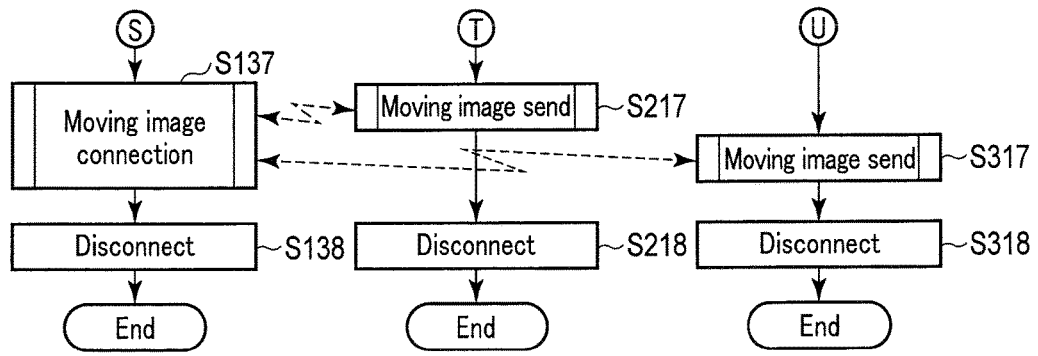
FIG. 4F
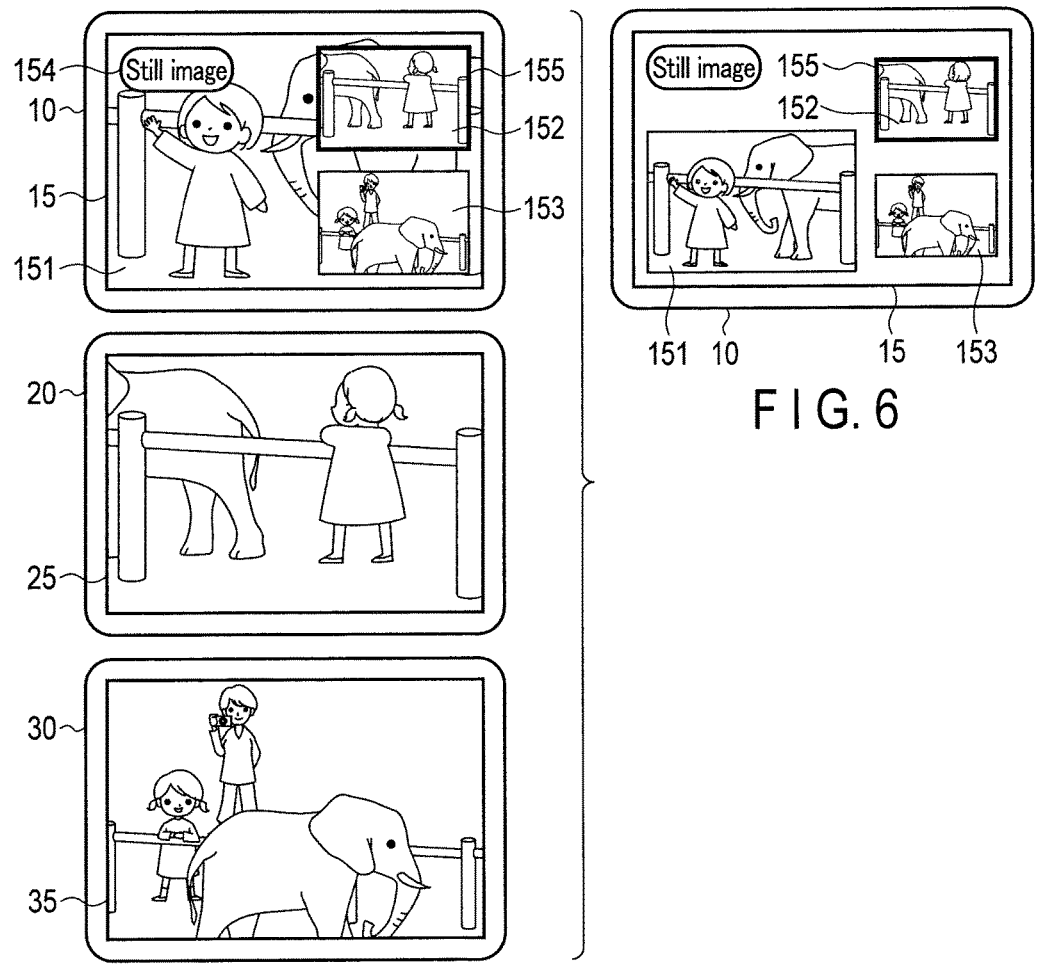
FIG. 5
FIG. 6

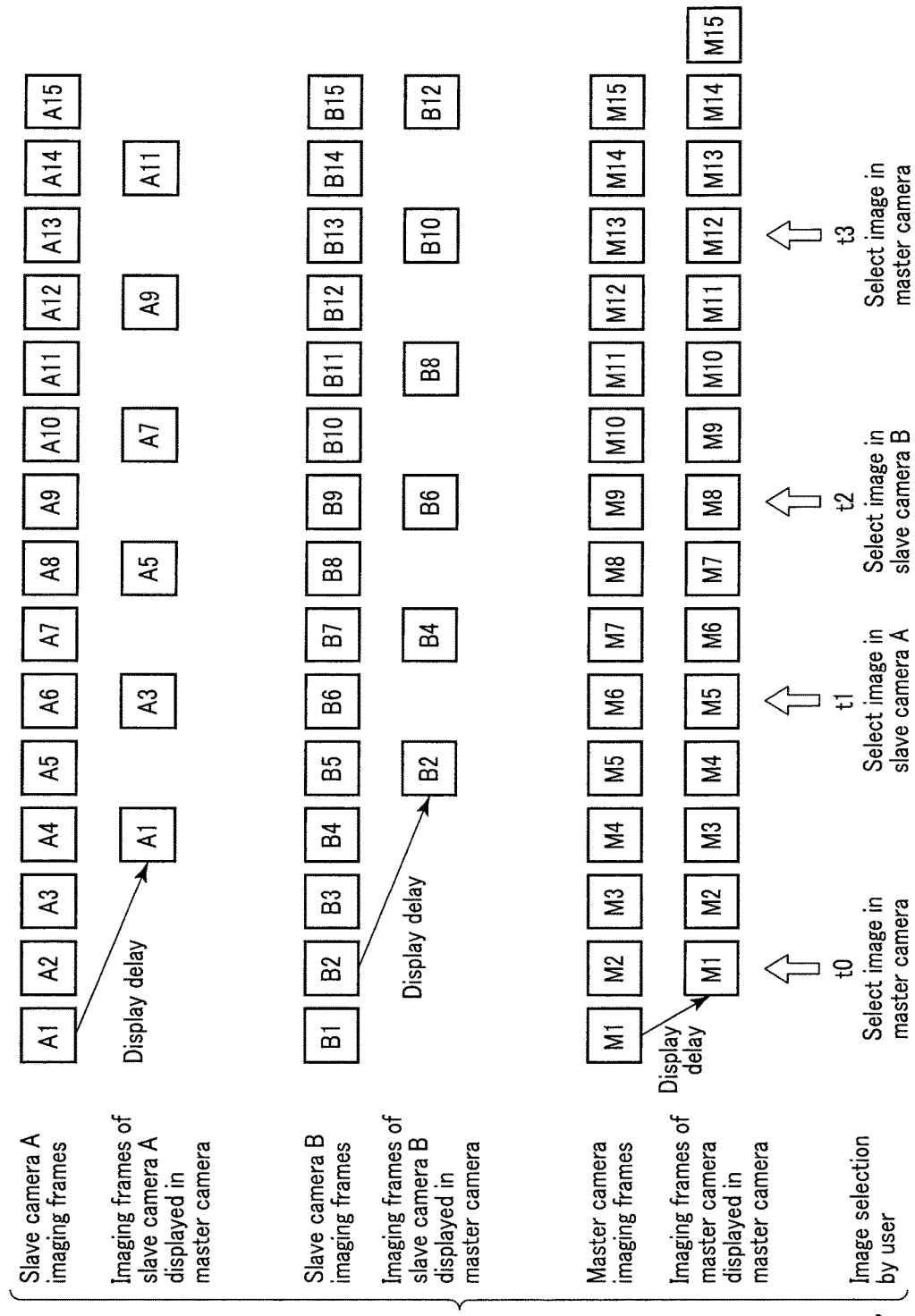
F I G. 7

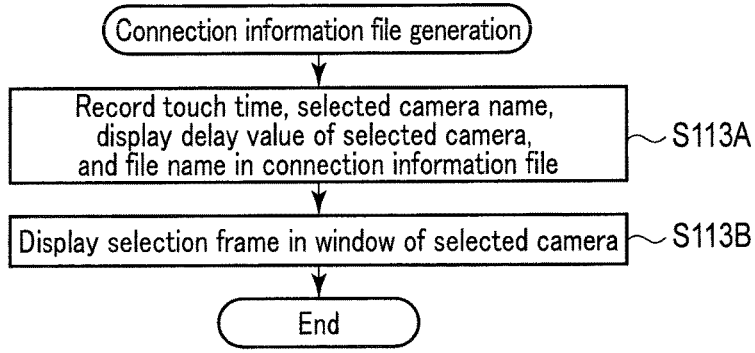
FIG. 8
| Time | Selected camera name | Display delay value | File name |
|---|---|---|---|
| t0 | Master | 1 | MOVIE_M.MOV |
| t1 | Slave camera A | 3 | MOVIE_SA.MOV |
| t2 | Slave camera B | 3 | MOVIE_SB.MOV |
| t3 | Master | 1 | MOVIE_M.MOV |
FIG. 9
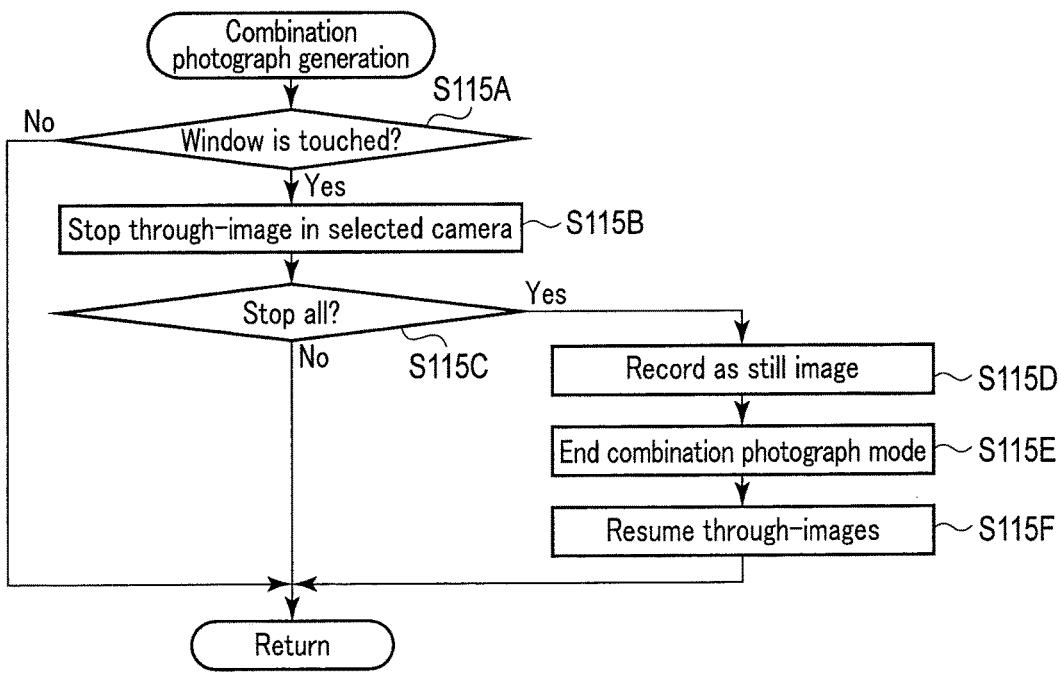
FIG. 10

| Time | Selected camera name | Display delay value | File name |
|---|---|---|---|
| t0 | Master | 1 | MOVIE_M1.MOV |
| t1 | Slave camera A | 3 | MOVIE_SA2.MOV |
| t2 | Slave camera B | 3 | MOVIE_SB3.MOV |
| t3 | Master | 1 | MOVIE_M4.MOV |

~171

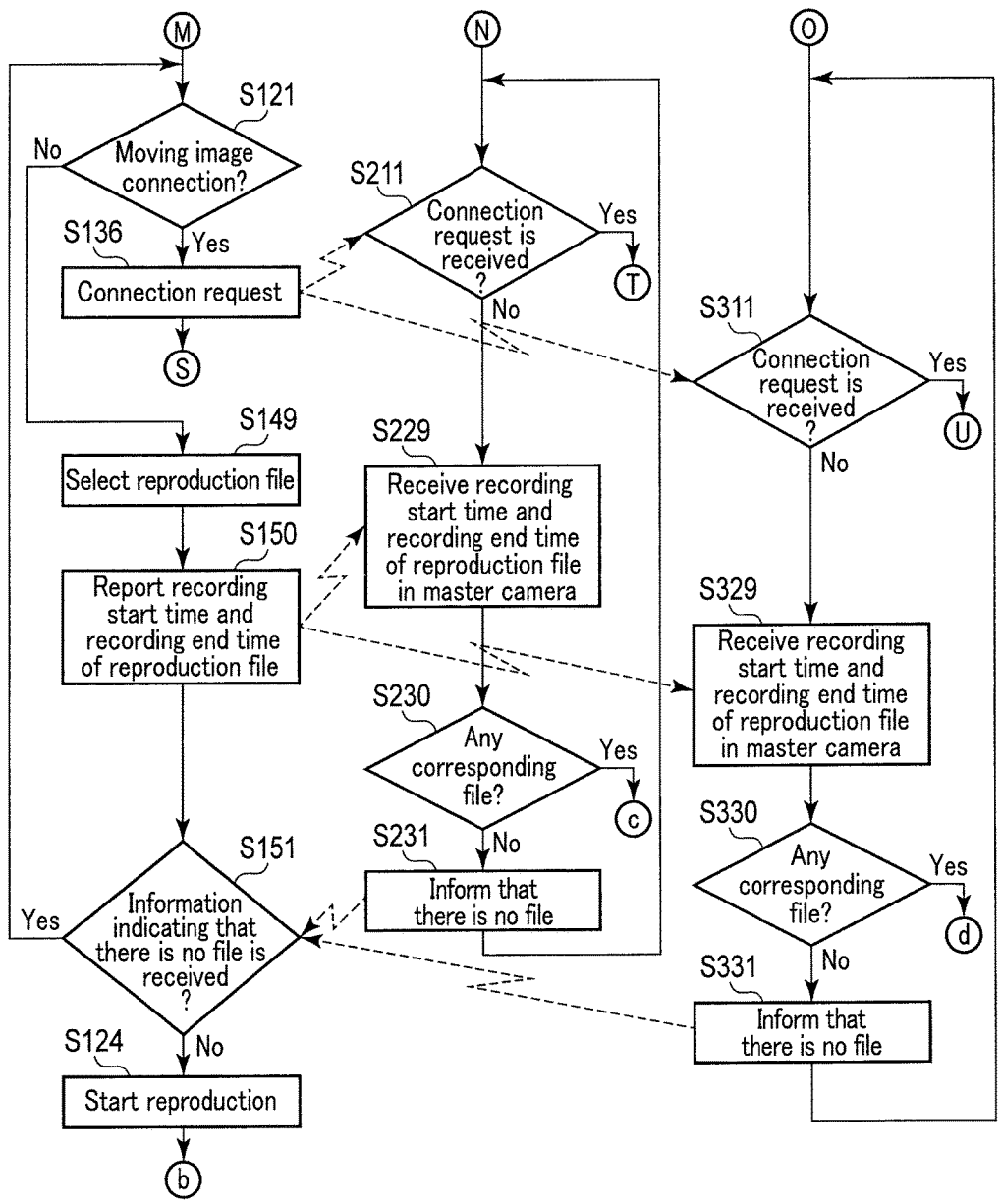
F I G. 16C

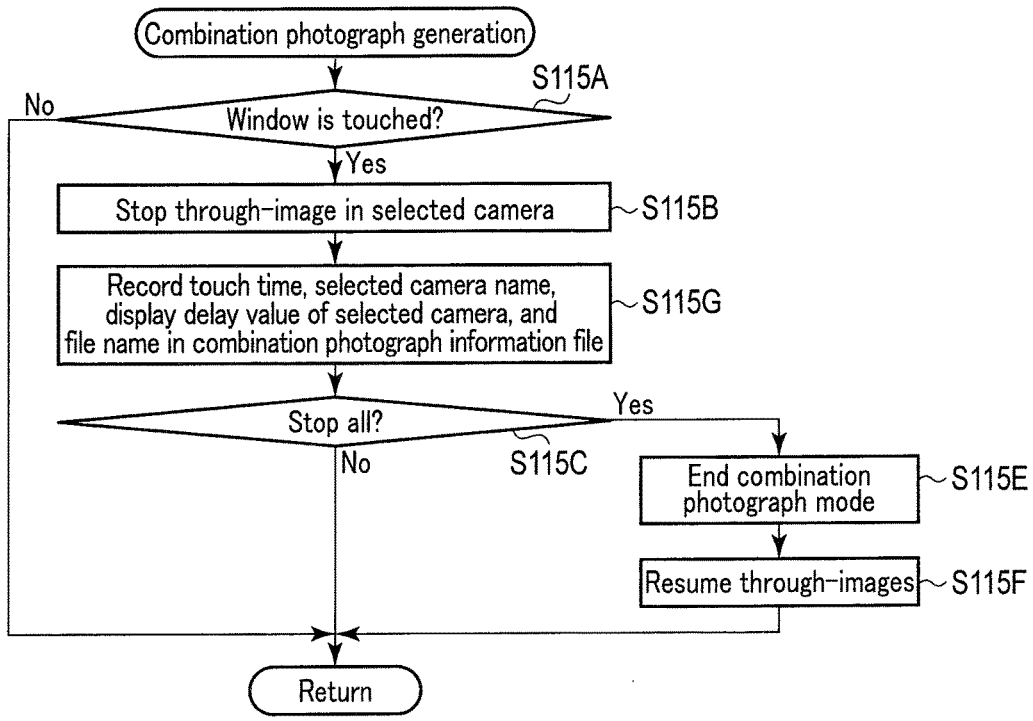
FIG. 18
| Time | Selected camera name | Display delay value | File name |
|------|---------------------|---------------------|-----------|
| t4 | Master | 1 | MOVIE_M.MOV |
| t5 | Slave camera B | 3 | MOVIE_SB.MOV |
| t6 | Slave camera A | 3 | MOVIE_SA.MOV |
FIG. 19
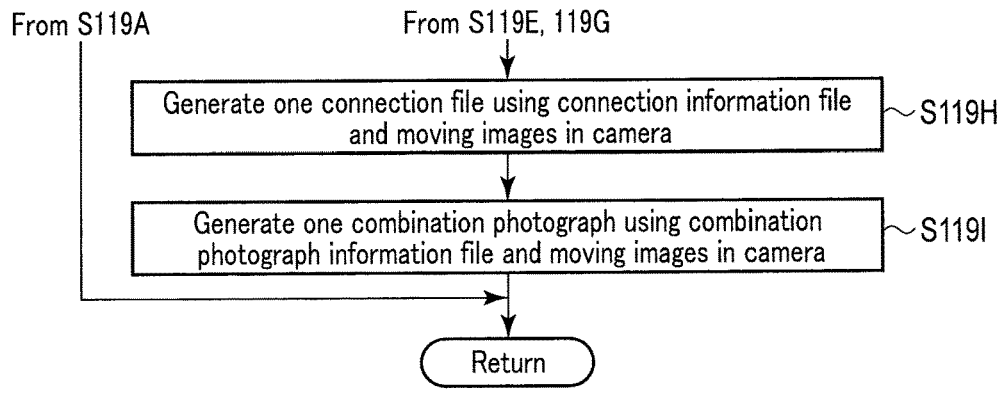
FIG. 20

IMAGE ACQUISITION APPARATUS, METHOD OF CONTROLLING IMAGE ACQUISITION APPARATUS, COMPUTER-READABLE RECORDING MEDIUM NON-TRANSITORILY STORING CONTROL PROGRAM OF IMAGE ACQUISITION APPARATUS, AND IMAGE ACQUISITION SYSTEM

CROSS-REFERENCE TO RELATED APPLICATION

This application is based upon and claims the benefit of priority from prior Japanese Patent Application No. 2014-172779, filed on Aug. 27, 2014, the entire contents of which are incorporated herein by reference.

BACKGROUND OF THE INVENTION

1. Field of the Invention

The present invention relates to an image acquisition apparatus, a method of controlling the image acquisition apparatus, a computer-readable recording medium non-transitory storing a control program of the image acquisition apparatus, and an image acquisition system.

2. Description of the Related Art

An image acquired by an image acquisition apparatus may be sent to an apparatus other than the former image acquisition apparatus, and then used in the latter apparatus.

For example, the following technique is disclosed in Jpn. Pat. Appln. KOKAI Publication No. 7-240868. A television camera image acquisition apparatus includes, as its components, a first television camera for wide-angle image photography and a second television camera for image photography which forms part of the wide-angle image. A cameraman (camera operator) controls the second television camera in accordance with camera operation information obtained from sequential photographic images from the first television camera.

In the meantime, not only digital cameras but also information portable terminals having imaging functions such as smartphones and tablet personal computers have come into wide use as the image acquisition apparatuses. Therefore, it is becoming commonplace that one person has one or more image acquisition apparatuses and that multiple persons photograph one scene with their image acquisition apparatuses. There have been needs for cooperative use of these image acquisition apparatuses.

BRIEF SUMMARY OF THE INVENTION

According to a first aspect of embodiments, there is provided an image acquisition apparatus including an imager unit configured to generate first sequential images by imaging, a communication unit configured to receive, from at least another image acquisition apparatus, range specifying sequential images that respectively correspond to second sequential images generated by imaging and that are smaller in communication amount than the second sequential images, a display unit configured to display first display images corresponding to the first sequential images simultaneously with second display images corresponding to the range specifying sequential images received by the communication unit, an operation unit configured to receives a specified range which is a range in the second sequential images specified by a user operation based on the second display image displayed on the display unit, and a controller unit configured to cause the communication unit to receive the second sequential images including at least the specified range from the other image acquisition apparatus.

According to a second aspect of embodiments, there is provided an image acquisition apparatus including a communication unit configured to communicate with another image acquisition apparatus, an imager unit configured to generate sequential images by imaging, a recording unit configured to record the sequential images, and a controller unit configured to generate range specifying sequential images that correspond to the sequential images recorded in the recording unit and that are smaller in communication amount than the sequential images recorded in the recording unit, in response to a request to send the range specifying sequential images from the other image acquisition apparatus, and then send the range specifying sequential images to the other image acquisition apparatus by the communication unit, and send the sequential images recorded in the recording unit to the other image acquisition apparatus by the communication unit in response to a request to send the sequential images from the other image acquisition apparatus.

According to a third aspect of embodiments, there is provided a method for controlling an image acquisition apparatus, the method including generating first sequential images by imaging, receiving, from at least another image acquisition apparatus, range specifying sequential images that respectively correspond to second sequential images generated by imaging and that are smaller in communication amount than the second sequential images, displaying first display images corresponding to the first sequential images simultaneously with second display images corresponding to the received range specifying sequential images, receiving a specified range which is a range in the second sequential images specified by a user operation based on the displayed second display images, and receiving the second sequential images including at least the specified range from the other image acquisition apparatus.

According to a fourth aspect of embodiments, there is provided a method for controlling an image acquisition apparatus, the method including generating sequential images by imaging, recording the sequential images, receiving a request to send range specifying sequential images from another image acquisition apparatus, generating range specifying sequential images that correspond to the received sequential images and that are smaller in communication amount than the received sequential images, in response to a request to send the range specifying sequential images, and then sending the range specifying sequential images to the other image acquisition apparatus, receiving a request to send the sequential images from the other image acquisition apparatus, and sending the recorded sequential images to the other image acquisition apparatus in response to a request to send the sequential images.

According to a fifth aspect of embodiments, there is provided a computer-readable recording medium non-transitory storing a program which allows a computer to generate first sequential images by imaging, receive, from at least another image acquisition apparatus, range specifying sequential images that respectively correspond to second sequential images generated by imaging and that are smaller in communication amount than the second sequential images, display first display images corresponding to the first sequential images simultaneously with second display images corresponding to the received range specifying sequential images, receive a specified range which is a range in the second sequential images specified by a user operation based on the displayed second display images, and receive the second sequential images including at least the specified range from the other image acquisition apparatus.

According to a sixth aspect of embodiments, there is provided a computer-readable recording medium non-transitory storing a program which allows a computer to generate sequential images by imaging, record the sequential images, receive a request to send range specifying sequential images from the other image acquisition apparatus, generate range specifying sequential images that correspond to the received sequential images and that are smaller in communication amount than the received sequential images, in response to a request to send the range specifying sequential images, and then send the range specifying sequential images to the other image acquisition apparatus, receive a request to send the sequential images from the other image acquisition apparatus, and send the recorded sequential images to the other image acquisition apparatus in response to a request to send the sequential images.

According to a seventh aspect of embodiments, there is provided an image acquisition system including image acquisition apparatuses, one of the image acquisition apparatuses functioning as a master image acquisition apparatus comprising a first imager unit configured to generate first sequential images by imaging, and the other image acquisition apparatus functioning as at least one slave image acquisition apparatus comprising a second imager unit configured to generate second sequential images by imaging, wherein the master image acquisition apparatus includes a first communication unit configured to communicate with the at least one slave image acquisition apparatus, the at least one slave image acquisition apparatus includes a second communication unit configured to communicate with the master image acquisition apparatus, a recording unit configured to record the second sequential images, and a range specifying sequential image sending unit configured to generate range specifying sequential images that correspond to the second sequential images and that are smaller in communication amount than the second sequential images and then send the range specifying sequential images to the master image acquisition apparatus by the second communication unit, the master image acquisition apparatus further includes a display unit configured to display first display images corresponding to the first sequential images simultaneously with second display images corresponding to the range specifying sequential images received by the first communication unit, an operation unit configured to receive a specified range which is a range in the second sequential images specified by a user operation based on the second display image displayed on the display unit, and a sequential image sending request unit configured to send a request to send the second sequential images including at least the specified range to the at least one slave image acquisition apparatus by the first communication unit, and the at least one slave image acquisition apparatus further includes a sequential image sending unit configured to send the second sequential images recorded in the recording unit including at least the specified range to the master image acquisition apparatus by the second communication unit, in response to a request to send the second sequential images from the master image acquisition apparatus, and the master image acquisition apparatus receives the second sequential images including at least the specified range from the at least one slave image acquisition apparatus by the first communication unit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4F is a diagram showing a sixth part of a flowchart showing an example of a master camera operation and slave camera operations of the image acquisition apparatuses in the image acquisition system according to the first embodiment;

FIG. 5 is a schematic diagram showing examples of images displayed on display units of the image acquisition apparatuses in the image acquisition system according to the first embodiment;

FIG. 6 is a schematic diagram showing another example of an image displayed on the display unit of the image acquisition apparatus serving as a master camera;

FIG. 7 is a schematic diagram showing an example of the relation between imaging frames of sequential images in the image acquisition apparatuses in the image acquisition system according to the first embodiment and imaging frames displayed on the display unit of the image acquisition apparatus serving as the master camera;

FIG. 8 is a flowchart showing an example of a connection information file generation subroutine during the master camera operation according to the first embodiment;

FIG. 9 is a table showing an example of connection information files created in the image acquisition apparatus serving as the master camera by the operation of the connection information file generation subroutine according to the first embodiment;

FIG. 10 is a flowchart showing an example of a combination photograph generation subroutine during the master camera operation according to the first embodiment;

FIG. 16C is a diagram showing a modified part of the flowchart in FIG. 4C, in a flowchart showing examples of the master camera operation and the slave camera operations in the image acquisition apparatuses in the image acquisition system according to the fourth embodiment;

FIG. 18 is a flowchart showing an example of a combination photograph generation subroutine according to a modification;

FIG. 19 is a table showing an example of a combination photograph information file created in the image acquisition apparatus serving as the master camera by the operation of the combination photograph generation subroutine according to the modification; and FIG. 20 is a flowchart showing a moving image connection subroutine according to the modification.

DETAILED DESCRIPTION OF THE INVENTION

Figure 1:
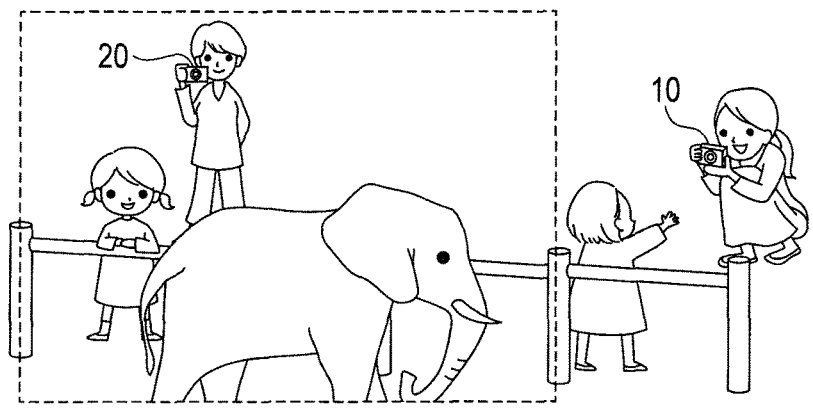
FIG. 1 is a schematic diagram showing how an image acquisition system according to a first embodiment of the present invention is used.

A first embodiment is described with reference to the drawings. FIG. 1 shows how an image acquisition system according to the present embodiment is used. The image acquisition system includes image acquisition apparatuses 10 and 20 according to the present embodiment. Although not shown in FIG. 1, the image acquisition system further includes an image acquisition apparatus 30 which is imaging a scene indicated by a broken line in FIG. 1. These image acquisition apparatuses 10, 20, and 30 are located to be able to communicate with one another. Thus, in the case described by way of example according to the present embodiment, the image acquisition system includes three image acquisition apparatuses. However, the present invention is not limited to three image acquisition apparatuses, and the image acquisition system has only to include at least two image acquisition apparatuses according to the present invention.

The image acquisition apparatuses 10, 20, and 30 are image acquisition apparatuses capable of acquiring moving images which are sequential images, such as digital video cameras or digital cameras. It should be understood that the image acquisition apparatuses are not limited to these digital video cameras or digital cameras, and may be portable information terminals having imaging functions such as smartphones or tablet personal computers. Thus, the image acquisition apparatuses may be any image acquisition apparatuses capable of obtaining moving images which are sequential images. Moreover, the image acquisition apparatuses are not limited to consumer-oriented cameras, and may be surveillance cameras, observation apparatuses for industrial devices for microscopy or inspection, or various medical observation apparatuses.

Figure 2:
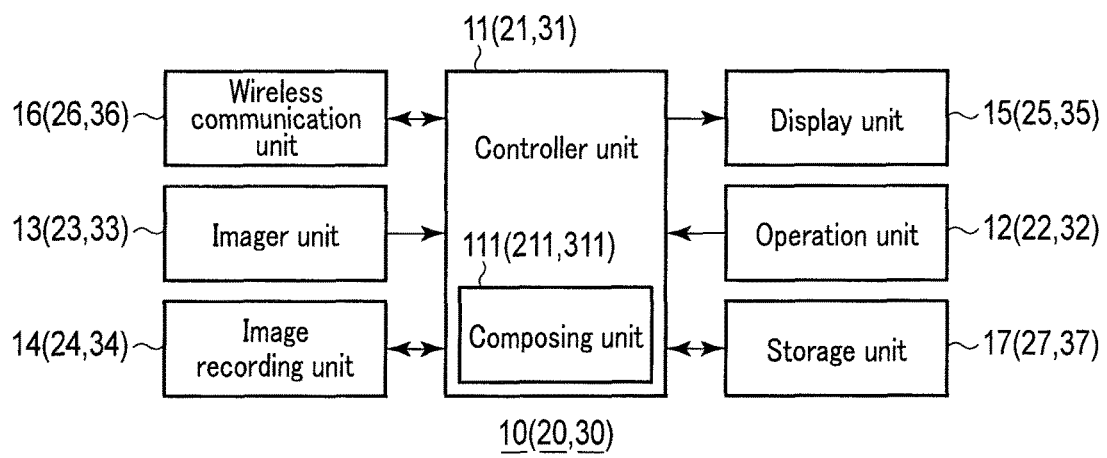
FIG. 2 is a block diagram showing an overview of a configuration example of an image acquisition apparatus according to a first embodiment of the present invention that constitutes the image acquisition system according to the first embodiment.
Figure 3:
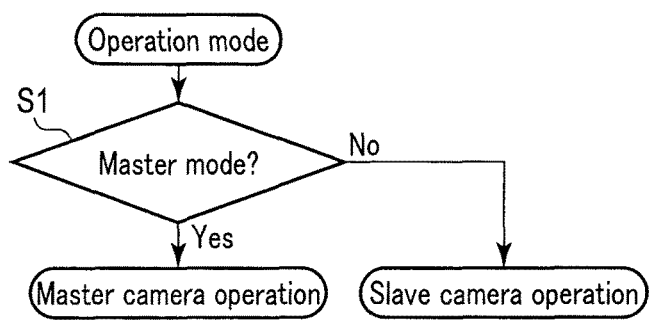
FIG. 3 is a flowchart showing an example of an operation of each image acquisition apparatus according to the first embodiment at startup.
Figure 4A:
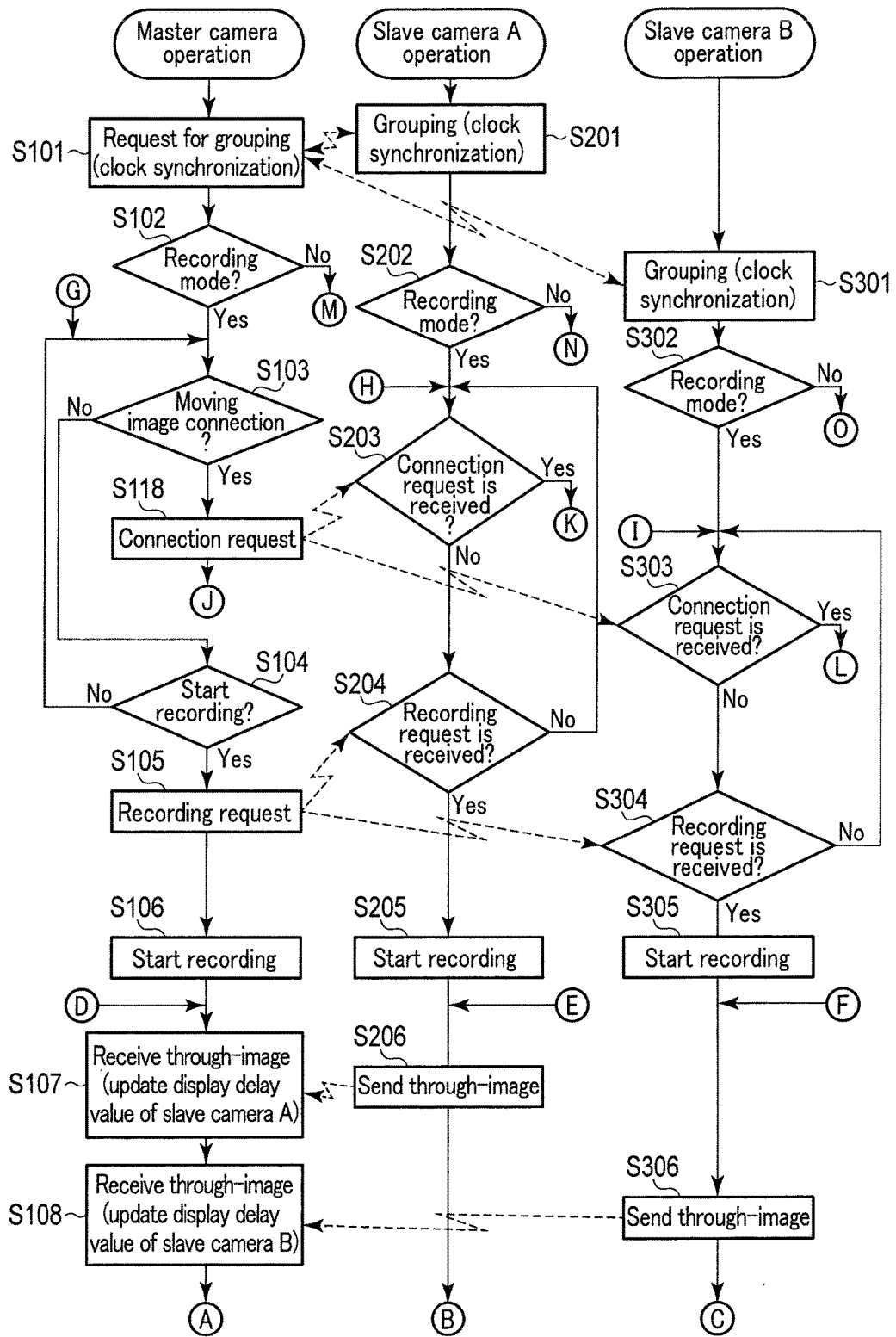
FIG. 4A is a diagram showing a first part of a flowchart showing an example of a master camera operation and slave camera operations of the image acquisition apparatuses in the image acquisition system according to the first embodiment.
Figure 4B:
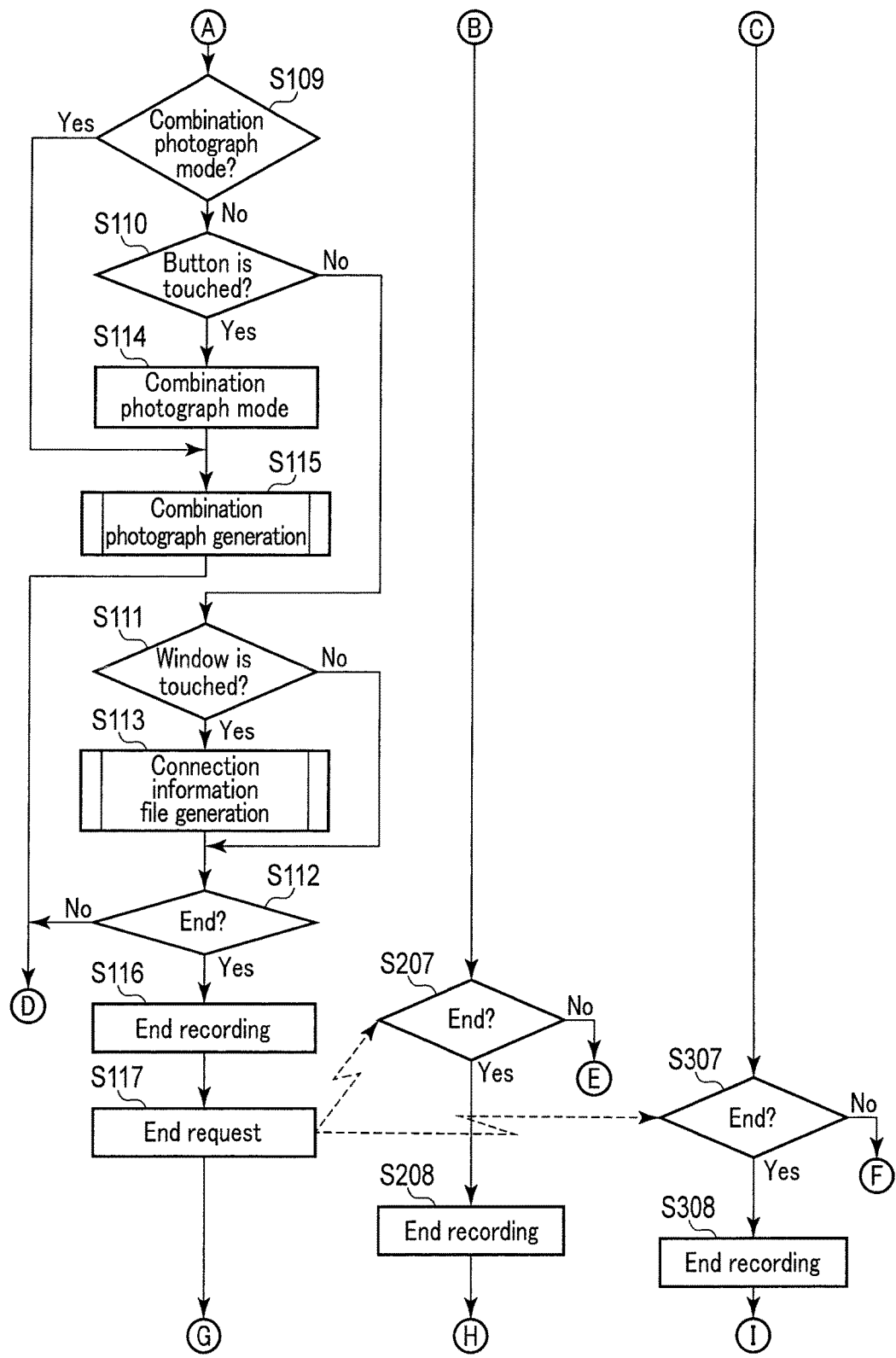
FIG. 4B is a diagram showing a second part of a flowchart showing an example of a master camera operation and slave camera operations of the image acquisition apparatuses in the image acquisition system according to the first embodiment.
Figure 4C:
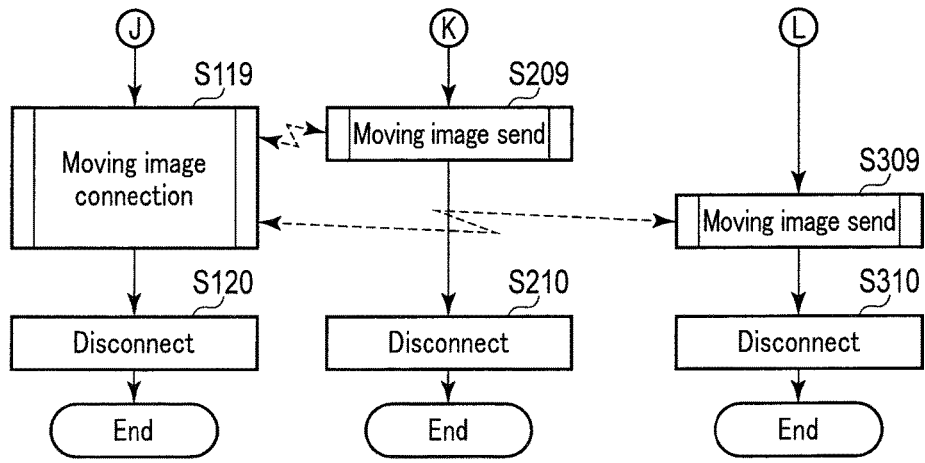
FIG. 4C is a diagram showing a third part of a flowchart showing an example of a master camera operation and slave camera operations of the image acquisition apparatuses in the image acquisition system according to the first embodiment.
Figure 4D:
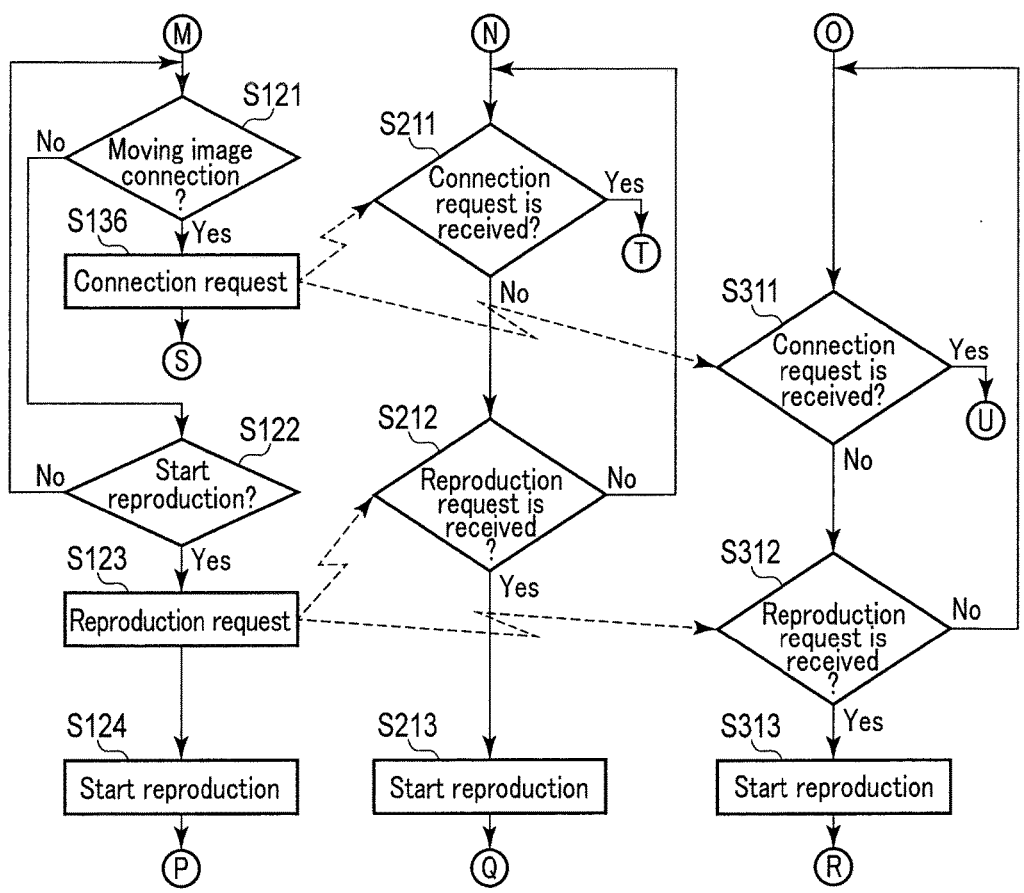
FIG. 4D is a diagram showing a fourth part of a flowchart showing an example of a master camera operation and slave camera operations of the image acquisition apparatuses in the image acquisition system according to the first embodiment.
Figure 4E:
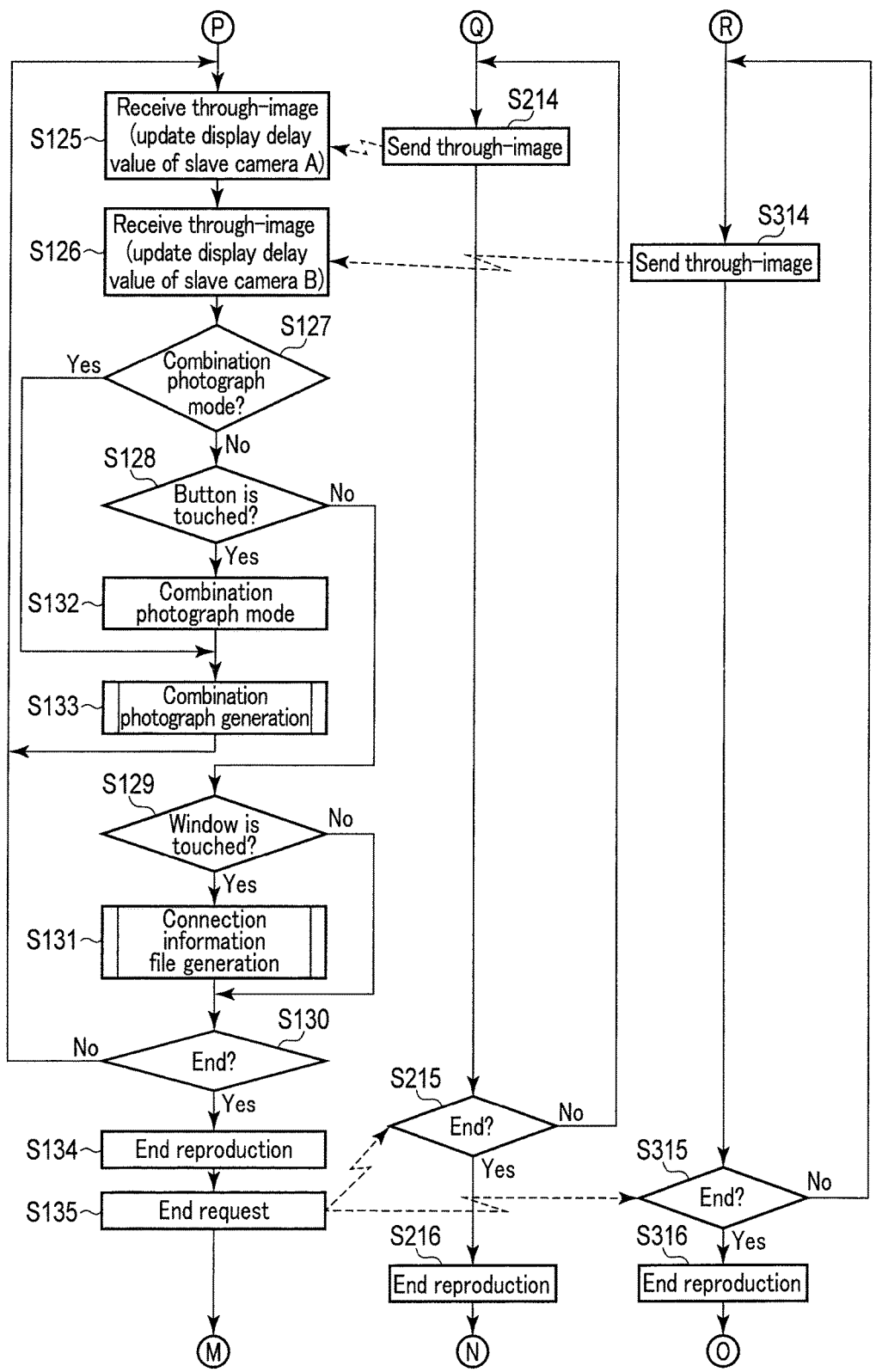
FIG. 4E is a diagram showing a fifth part of a flowchart showing an example of a master camera operation and slave camera operations of the image acquisition apparatuses in the image acquisition system according to the first embodiment.

As shown in FIG. 2, the image acquisition apparatus 10 includes a controller unit 11, an operation unit 12, an imager unit 13, an image recording unit 14, a display unit 15, a wireless communication unit 16, and a storage unit 17.

The controller unit 11 includes, for example, a central processing unit (CPU) or an application specific integrated circuit (ASIC), and performs various computations. The controller unit 11 controls the operation of each unit of the image acquisition apparatus 10, and performs various kinds of image processing. The controller unit 11 operates in accordance with a program recorded in the storage unit 17. The controller unit 11 includes a composing unit 111. This composing unit 111 can be configured as hardware in the controller unit 11. Alternatively, the composing unit 111 may be configured as software such that the controller unit 11 performs the functions of the composing unit 111.

The operation unit 12 is, for example, a button provided in the image acquisition apparatus 10. Here, the operation unit 12 includes a substantial button such as a power button or an imaging start/end instruction button for moving images. The operation unit 12 can also include a virtual button including a button icon displayed on display unit 15 and a touch screen provided in the display unit 15. The operation unit 12 receives an instruction from a user, and transmits this instruction to the controller unit 11 as an operation signal.

The imager unit 13 includes an optical system including a lens and a diaphragm, and an image sensor device. The optical system forms a subject figure on an imaging surface of the image sensor device, and the image sensor device generates image data on the basis of the subject figure. The imager unit 13 transmits the generated image data to the controller unit 11. This image data is image-processed in the controller unit 11. For example, the controller unit 11 image-processes the image data acquired from the image sensor device for a through-image. Here, the through-image is an image resized in accordance with an image size and resolution in the display unit 15. Therefore, the image processing in the controller unit 11 includes the reduction of images. Thus, the controller unit 11 generates the through-image by the image processing. The display unit 15 is, for example, a liquid crystal display, and displays this through-image.

The image recording unit 14 is a general recording medium. The image recording unit 14 may be fixed to the image acquisition apparatus 10, or may be attachable to and detachable from the image acquisition apparatus 10. The controller unit 11 records the image data which has been subjected image processing such as predetermined image correction, in the image recording unit 14 as one still image file in response to the operation of a shutter button of the operation unit 12. Alternatively, the controller unit 11 can also record image data (raw data) before image-processed in the image recording unit 14 as one still image file. Further, the controller unit 11 sequentially processes image data sequentially supplied from the imager unit 13 to generate sequential images which are moving image data. The controller unit 11 then records the sequential images in the image recording unit 14 as one moving image file.

The wireless communication unit 16 performs data communication with the other image acquisition apparatuses 20 and 30 which are external apparatuses under the control of the controller unit 11 by using a wireless communication method such as wireless LAN or Bluetooth (registered trademark).

As described above, the storage unit 17 stores the program for operating the controller unit 11. Moreover, the storage unit 17 is used as a work memory or a register during the operation of the controller unit 11. This storage unit 17 is configured to be separate from the controller unit 11, but may be incorporated in the controller unit 11.

The composing unit 111 of the controller unit 11 uses the through-image based on the image data from the imager unit 13 and through-images received from the other image acquisition apparatuses 20 and 30 via the wireless communication unit 16, and composes these through-images by superimposition or layout, and then displays the composition on the display unit 15. Further, the composing unit 111 composes, into one set of sequential images, the sequential images recorded in the image recording unit 14 as the moving image file and sequential images received from the other image acquisition apparatuses 20 and 30 via the wireless communication unit 16, as will be described later in detail. The composing unit 111 then records the composed sequential images in the image recording unit 14 as one moving image file.

The image acquisition apparatus 20 includes a controller unit 21, an operation unit 22, an imager unit 23, an image recording unit 24, a display unit 25, a wireless communication unit 26, and a storage unit 27 that have similar functions as the controller unit 11, the operation unit 12, the imager unit 13, the image recording unit 14, the display unit 15, the wireless communication unit 16, and the storage unit 17 in the image acquisition apparatus 10. The controller unit 21 includes a composing unit 211 having similar functions as the composing unit 111 of the controller unit 11 of the image acquisition apparatus 10.

Similarly, the image acquisition apparatus 30 includes a controller unit 31, an operation unit 32, an imager unit 33, an image recording unit 34, a display unit 35, a wireless communication unit 36, and a storage unit 37 that have similar functions as the controller unit 11, the operation unit 12, the imager unit 13, the image recording unit 14, the display unit 15, the wireless communication unit 16, and the storage unit 17 in the image acquisition apparatus 10. The controller unit 31 includes a composing unit 311 having similar functions as the composing unit 111 of the controller unit 11 of the image acquisition apparatus 10.

Now, the operation of the image acquisition system according to the first embodiment is described. The present image acquisition system combines, on one image acquisition apparatus, sequential images recorded in the one image acquisition apparatus with sequential images recorded in other image acquisition apparatuses, and thereby creates one new set of sequential images on the one image acquisition apparatus. That is, for example, in the situation of use in FIG. 1, the user of the image acquisition apparatus 10 performs imaging in cooperation with other users (the users of the image acquisition apparatuses 20 and 30). The sequential images created by the image acquisition apparatuses 10, 20, and 30 are used to create, only by the operation on one image acquisition apparatus 10, new sequential images in which angles and scenes change.

A specific operation example of the image acquisition system according to the first embodiment is described below with reference to flowcharts shown in FIG. 3 and FIG. 4A to FIG. 4F. The operation shown in these drawings is processing executed by the controller unit 11, 21, or 31 in accordance with the program stored in the storage unit 17, 27, or 37. In this processing shown in the case, an operation mode is set to a cooperation mode when the image acquisition apparatus 10, 20, or 30 starts in response to a power-on operation of the operation unit 12, 22, or 32 of the image acquisition apparatus 10, 20, or 30. This processing also applies to the case where the operation mode of the image acquisition apparatus 10, 20, or 30 is set to the cooperation mode by a predetermined mode setting operation of the operation unit 12, 22, or 32 of the image acquisition apparatus 10, 20, or 30. Here, the operation mode is set by a user operation in the operation unit 12, 22, or 32, and stored in the storage unit 17, 27, or 37 in a non-volatile manner. The cooperation mode is a mode for operating in cooperation with other cameras.

First, in step S1, the controller unit 11, 21, or 31 of the image acquisition apparatus 10, 20, or 30 judges whether the operation mode in the cooperation mode is set to a master mode. Here, when judging that the operation mode is set to the master mode, the controller unit 11, 21, or 31 performs a later-described master camera operation. When judging that the operation mode is not set to the master mode, the controller unit 11, 21, or 31 performs a later-described slave camera operation.

In the present embodiment, one of the image acquisition apparatuses 10, 20, and 30 is set to the master mode to perform the master camera operation. In the case described by way of example here, the image acquisition apparatus 10 is set to the master mode to perform the master camera operation, and the other image acquisition apparatuses 20 and 30 perform the slave camera operation. For convenience, hereinafter, the image acquisition apparatus 10 is referred to as a master camera, the image acquisition apparatus 20 is referred to as a slave camera A, and the image acquisition apparatus 30 is referred to as a slave camera B, and details of the master camera operation and the slave camera operations by the controller unit 11, 21, or 31 are described.

In step S101, the controller unit 11 of the master camera requests the slave cameras for grouping via the wireless communication unit 16. Accordingly, in step S201, the controller unit 21 of the slave camera A performs grouping with the master camera via the wireless communication unit 26. Similarly, in step S301, the controller unit 31 of the slave camera B performs grouping with the master camera via the wireless communication unit 36. The grouping includes such operations as pairing of the master camera and the slave cameras, the selection of the slave cameras to be connected to the master camera and connection processing for the master camera and the slave cameras based on the selection, and synchronization of internal clocks (not shown) of the slave cameras with an internal clock (not shown) of the master camera. As a result of the synchronization of the internal clocks of the master camera and the slave camera, the moving image file of the sequential images recorded in the master camera can be associated by a time stamp with the moving image files of the sequential images recorded in the slave cameras A and B. Hereinafter, the sequential images recorded in the master camera are referred to as first sequential images, and the sequential images recorded in the slave cameras A and B are referred to as second sequential images.

In step S102, the controller unit 11 of the master camera then judges whether the operation mode is set to a recording mode. Here, when judging that the operation mode is set to the recording mode, the controller unit 11 advances the processing to step S103. On the contrary, when judging that the operation mode is not set to the recording mode, that is, when judging that the operation mode is set to a reproduction mode, the controller unit 11 advances the processing to step S121.

In step S103, the controller unit 11 of the master camera judges whether an instruction to start moving image connection has been issued by the user's operation on the operation unit 12. Here, when judging that the instruction to start moving image connection has been issued, the controller unit 11 advances the processing to step S118. On the contrary, when judging that the instruction to start moving image connection has not been issued, the controller unit 11 advances the processing to step S104. In step S104, the controller unit 11 judges whether an instruction to start the recording of the first sequential images has been issued by the user's operation on the operation unit 12. Here, when judging that the instruction to start the recording of the first sequential images has not been issued, the controller unit 11 returns the processing to step S103. Thus, the master camera waits until some instruction from the user is issued. In this instance, the controller unit 11 causes the imager unit 13 to perform imaging, processes frame image data from the imager unit 13 to generate a through-image, and displays the through-image on the display unit 15.

Meanwhile, in step S202, the controller unit 21 of the slave camera A judges whether the operation mode is set to the recording mode. Here, when judging that the operation mode is set to the recording mode, the controller unit 21 advances the processing to step S203. On the contrary, when judging that the operation mode is not set to the recording mode, that is, when judging that the operation mode is set to the reproduction mode, the controller unit 21 advances the processing to step S210.

In step S203, the controller unit 21 judges whether a connection request from the master camera has been received by the wireless communication unit 26. Here, when judging that the connection request has been received, the controller unit 21 advances the processing to step S209. On the contrary, when judging that the connection request has not been received, the controller unit 21 advances the processing to step S204. In step S204, the controller unit 21 judges whether a recording request from the master camera has been received by the wireless communication unit 26. Here, when judging that the recording request has been received, the controller unit 21 returns the processing to step S203. Thus, the slave camera A waits until some instruction from the master camera is issued. In this instance, the controller unit 21 causes the imager unit 23 to perform imaging, processes frame image data from the imager unit 23 to generate a through-image, and displays the through-image on the display unit 25.

Similarly, in step S302, the controller unit 31 of the slave camera B judges whether the operation mode is set to the recording mode. Here, when judging that the operation mode is set to the recording mode, the controller unit 31 advances the processing to step S303. On the contrary, when judging that the operation mode is not set to the recording mode, that is, when judging that the operation mode is set to the reproduction mode, the controller unit 31 advances the processing to step S310.

In step S303, the controller unit 31 judges whether a connection request from the master camera has been received by the wireless communication unit 36. Here, when judging that the connection request has been received, the controller unit 31 advances the processing to step S309. On the contrary, when judging that the connection request has not been received, the controller unit 31 advances the processing to step S304. In step S304, the controller unit 31 judges whether a recording request from the master camera has been received by the wireless communication unit 36. Here, when judging that the recording request has been received, the controller unit 31 returns the processing to step S303. Thus, the slave camera B waits until some instruction from the master camera is issued. In this instance, the controller unit 31 causes the imager unit 33 to perform imaging, processes frame image data from the imager unit 33 to generate a through-image, and displays the through-image on the display unit 35.

When judging in step S104 that the instruction to start the recording of the first sequential images has been issued by the user's operation on the operation unit 12, the controller unit 11 of the master camera advances the processing to step S105. In step S105, the controller unit 11 sends a recording request to the slave cameras A and B via the wireless communication unit 16. In step S106, the controller unit 11 processes image data from the imager unit 13 to generate the first sequential images, and starts the recording of the first sequential images in the image recording unit 14. In this instance, the controller unit 11 also generates a through-image corresponding to each frame image data for the first sequential images to be recorded, and displays the through-image on the display unit 15. That is, the through-image is a first display image corresponding to each frame image data for the first sequential images. The controller unit 11 then advances the processing to step S107.

Meanwhile, in step S204, the controller unit 21 of the slave camera A judges whether the recording request from the master camera has been received by the wireless communication unit 26 in response to the sending of the recording request from the master camera in step S105, and the controller unit 21 advances the processing to step S205. In step S205, the controller unit 21 processes image data from the imager unit 23 to generate the second sequential images, and starts the recording of the second sequential images in the image recording unit 24. In this instance, the controller unit 21 also generates a through-image corresponding to each frame image data for the second sequential images to be recorded, and displays the through-image on the display unit 25. In step S206, the controller unit 21 sends this through-image to the master camera by the wireless communication unit 26. The controller unit 21 then advances the processing to step S207.

Meanwhile, in step S304, the controller unit 31 of the slave camera B judges whether the recording request from the master camera has been received by the wireless communication unit 36 in response to the sending of the recording request from the master camera in step S105, and the controller unit 31 advances the processing to step S305. In step S305, the controller unit 31 processes image data from the imager unit 33 to generate the second sequential images, and starts the recording of the second sequential images in the image recording unit 34. In this instance, the controller unit 31 also generates a through-image corresponding to each frame image data for the second sequential images to be recorded, and displays the through-image on the display unit 35. In step S306, the controller unit 31 sends this through-image to the master camera by the wireless communication unit 36. The controller unit 31 then advances the processing to step S307.

In step S107, the controller unit 11 of the master camera receives the through-image from the slave camera A by the wireless communication unit 16. The controller unit 11 composes the received through-image from the slave camera A with the through-image in this master camera by the composing unit 111 as a through-image serving as a second display image to be displayed on the display unit 15. As a result, the controller unit 11 can display the received through-image on the display unit 15 simultaneously with the through-image in this master camera. At the same time, the controller unit 11 also updates a slave camera A display delay value.

In step S108, the controller unit 11 of the master camera receives the through-image from the slave camera B by the wireless communication unit 16. The controller unit 11 composes the received through-image from the slave camera B with the through-image in this master camera by the composing unit 111 as a through-image serving as a second display image to be displayed on the display unit 15. As a result, the controller unit 11 can display the received through-image on the display unit 15 simultaneously with the through-image in this master camera. That is, the received two through-images are also displayed on the display unit 15 simultaneously with the through-image in this master camera. At the same time, the controller unit 11 also updates a slave camera B display delay value. The controller unit 11 then advances the processing to step S109. The "slave camera display delay value" will be described later.

The through-image in the master camera and the through-images in the slave cameras A and B can be composed by the composing unit 111, that is, these three through-images can be simultaneously displayed on the display unit 15, for example, as shown in FIG. 5. That is, a master camera window 151 is displayed full-screen in the display screen of the display unit 15. A slave camera A window 152 and a slave camera B window 153 are opened on the master camera window 151. Thus, the three through-images can be simultaneously displayed on the display unit 15 in such a manner that the through-images in the slave cameras A and B are displayed over the through-image in the master camera. In this instance, the respective through-images are only displayed on the display units 25 and 35 of the slave cameras A and B.

Alternatively, the through-image in the master camera and the through-images in the slave cameras A and B may be composed by the composing unit 111, for example, as shown in FIG. 6. That is, the master camera window 151, the slave camera A window 152, and the slave camera B window 153 are laid out in the display screen of the display unit 15. Thus, the three through-images can be simultaneously displayed on the display unit 15 in such a manner that all the through-images are laid out and displayed.

As shown in FIG. 5 and FIG. 6, the controller unit 11 displays a combination photograph generation instruction button 154 for instructing to set the master camera to a combination photograph mode, on the display unit 15 as an icon. In the present embodiment, the combination photograph generation instruction button 154 is presented as a general character icon "still image" for easy identification by the user. However, the combination photograph generation instruction button 154 may have a character icon "combination photograph". Moreover, it should be understood that the combination photograph generation instruction button 154 may have any icon that is recognizable by the user, such as a graphical icon which represents the state in FIG. 5 with the combination of squares.

In step S109, the controller unit 11 judges whether the camera is set to the combination photograph mode. Here, when judging that the camera is not set to the combination photograph mode, the controller unit 11 advances the processing to step S110. In step S110, the controller unit 11 judges whether the combination photograph generation instruction button 154 has been touched, that is, whether the position corresponding to the combination photograph generation instruction button 154 in the touch screen of the operation unit 12 has been touched. When judging that the combination photograph generation instruction button 154 has not been touched, the controller unit 11 further judges in step S111 whether one of the master camera window 151, the slave camera A window 152, and the slave camera B window 153 has been touched. That is, the controller unit 11 judges whether the position corresponding to one of the windows in the touch screen of the operation unit 12 has been touched. Here, when judging that the window has not been touched, the controller unit 11 advances the processing to step S112. In step S112, the controller unit 11 judges whether an instruction to end the recording of the first sequential images has been issued by the user's operation on the operation unit 12. When judging that the instruction to end the recording of the first sequential images has not yet been issued, the controller unit 11 returns the processing to step S107.

In step S207, the controller unit 21 of the slave camera A judges whether an end request from the master camera has been received by the wireless communication unit 26. When judging that the end request has not been received, the controller unit 21 returns the processing to step S206.

Similarly, in step S307, the controller unit 31 of the slave camera B judges whether an end request from the master camera has been received by the wireless communication unit 36. When judging that the end request has not been received, the controller unit 31 returns the processing to step S306.

Thus, the recording of the first sequential images in the master camera and the recording of the second sequential images in the slave cameras A and B as well as the simultaneous display of the through-image in the display unit 15 of the master camera and the through-images in the slave cameras A and B are continued. Therefore, the through-images that are sequentially sent to the master camera from the slave cameras A and B are range specifying sequential images corresponding to the second sequential images, and are reduced compared to the second sequential images and are therefore smaller in communication amount than the second sequential images.

Here, the "slave camera display delay value" is described with reference to FIG. 7. In the present embodiment, the "display delay" means the time from the point of imaging in the imager unit to the display of the through-image corresponding to the image data on the display unit 15 of the master camera.

The display delay in the master camera is the time taken before the through-image corresponding to the image data acquired by the imaging in its imager unit 13 is displayed on its display unit 15. Therefore, the display delay is only the delay amount related to image processing such as reduction for processing in which the controller unit 11 processes the image data from the imager unit 13 to generate a through-image. Thus, this delay amount is, for example, only a slight delay of one imaging frame. Accordingly, in this example, a "master camera display delay value" is "1".

Compared to the display delay amount in such a master camera, the "slave camera display delay value" is the time taken before the through-images corresponding to the image data acquired by the imaging in the imager units 23 and 33 of the slave cameras are displayed on the display unit 15 of the master camera. In this case, the delay amount is the total of the following two delay amounts. The first delay amount is the delay amount from the generation of through-images in the controller units 21 and 31 of the slave cameras by image processing such as reduction of the image data acquired by the imaging in the imager units 23 and 33 to the completion of the communication of the through-images by the wireless communication units 26 and 36. The second delay amount is the delay amount from the completion of the receipt of the through-images by the wireless communication unit 16 of the master camera to the display of the received through-images on the display unit 15 after image processing for resizing (reducing) the through-images in accordance with the sizes of the windows 152 and 153 of the display unit 15. Thus, in the example of FIG. 7, for example, a delay of three imaging frames is produced, so that the "slave camera display delay value" is "3".

In the master camera, the delay amount from the completion of the receipt by the wireless communication unit 16 to the display on the display unit 15 is the delay amount related to its image processing, and can therefore be managed. In contrast, the delay amount related to the processing from the imaging by the slave camera to the completion of the communication varies according to the processing power of each slave camera, and can be managed in the slave camera but cannot be managed in the master camera. Therefore, when sending the through-images from the slave cameras to the master camera in steps S206 and S306, the controller units 21 and 31 of the slave cameras send the delay amounts managed in these slave cameras together with the through-images as metadata. In steps S107 and S108, whenever receiving through-images from the slave cameras, the master camera adds up the sent delay amounts managed by the slave cameras and the delay amount which is related to the display of the received through-images and which is managed by this master camera, and updates and stores the addition in the storage unit 17 as the "slave camera display delay value".

In this way, the controller unit 11 of the master camera can detect and manage the "slave camera display delay value" in real time whenever receiving through-image from the slave camera.

Regarding the image processing for resizing (reducing) the received through-images in the slave cameras in accordance with the sizes of the windows 152 and 153 of the display unit 15, it is difficult for the controller unit 11 to process two through-images because of its processing power. Thus, in the present embodiment, the through-images in the slave cameras are thinned in every other frame and then displayed on the display unit 15 as shown in FIG. 7. Therefore, although there are two slave cameras in this case, the number of frames to be thinned increases if the number of slave cameras is increased to three or four.

Alternatively, instead of thinning and displaying the through-images received by the master camera, the through-images may be sent in a thinned state by the slave cameras at a frame rate corresponding to the number of the slave cameras. In this case, the master camera has only to receive and display the sent through-images. For example, it is only necessary to alternately conduct steps S107 and S108 in the example of two slave cameras.

In this way, the recording of the first sequential images in the master camera and the recording of the second sequential images in the slave cameras A and B as well as the simultaneous display of the through-image in the display unit 15 of the master camera and the through-images in the slave cameras A and B are continued. In this situation, the user of the master camera touches the windows at a desired timing, and selects angles and scenes to be new sequential images.

That is, when judging in step S111 that one of the master camera window 151, the slave camera A window 152, and the slave camera B window 153 has been touched, the controller unit 11 of the master camera executes a connection information file generation subroutine in step S113. After ending the processing in this connection information file generation subroutine, the controller unit 11 advances the processing to step S112.

In the connection information file generation subroutine in step S113, the controller unit 11 performs an operation shown in FIG. 8. That is, the controller unit 11 first records a touch time, a selected camera name, a display delay value, and a file name in a connection information file 171 formed in the storage unit 17 as shown in FIG. 9 in step S113A. Here, the touch time is the time at which a touch is performed. The selected camera name is information that identifies the camera (hereinafter referred to as a selected camera) of the selected window. The display delay value is the display delay value of the selected camera updated and stored in the storage unit 17 in steps S107 or S108. The file name is information that identifies the moving image file of the sequential images being recorded by the selected camera. The master camera and the slave cameras are configured so that the file names of the moving image files recorded in the image recording units 14, 24, and 34 in this cooperation mode are given by a predetermined naming rule. Therefore, the file names that comply with this naming rule are stored in the connection information file 171. In steps S113B, a selection frame 115 is displayed in the window of the selected camera as shown in FIG. 5 or FIG. 6. The controller unit 11 then ends the processing in this connection information file generation subroutine, and returns the processing to the upper routine.

The storage example of the connection information file 171 shown in FIG. 9 corresponds to the example in FIG. 7. That is, the connection information file 171 shown in FIG. 9 shows the following state. First, at a time t0, the master camera window 151 is touched, and the image in the master camera is selected. At a time t1, the slave camera A window 152 is then touched, and the image in the slave camera A is selected. At a time t2, the slave camera B window 153 is then touched, and the image in the slave camera B is selected. At a time t3, the master camera window 151 is again touched, and the image in the master camera is selected.

Thus, the connection information file 171 is information that identifies the original image of the through-image displayed on the display unit 15 of the master camera at a given time. However, there is a display delay amount between the through-image and the corresponding original image of the moving image file as described above. Thus, it can be said that the master camera, the slave camera A, and the slave camera B have original images acquired at past times compared to the through-image displayed at a given time. Therefore, the connection information file 171 functions as a backdating tag for dating back to the image in the moving image file at a time before a given time.

When judging in step S110 that the combination photograph generation instruction button 154 has been touched, the controller unit 11 of the master camera advances the processing to step S114. In step S114, the controller unit 11 sets the camera to the combination photograph mode. In step S115, a combination photograph generation subroutine is executed. When judging in step S109 that the camera is set to the combination photograph mode, the controller unit 11 also advances the processing to step S115, and executes the combination photograph generation subroutine. After ending the processing in step S115, the controller unit 11 advances the processing to step S107.

In the combination photograph generation subroutine in step S115, the controller unit 11 performs an operation shown in FIG. 10. That is, the controller unit 11 first judges in step S115A whether one of the master camera window 151, the slave camera A window 152, and the slave camera B window 153 has been touched. That is, the controller unit 11 judges whether the position corresponding to one of the windows in the touch screen of the operation unit 12 has been touched. When judging that none of the windows has been touched, the controller unit 11 ends the processing in this combination photograph generation subroutine, and returns the processing to the upper routine. Therefore, the controller unit 11 loops the processing in steps S107, S108, S109, and S115 until one of the windows is touched.

When judging in step S115A that one of the master camera window 151, the slave camera A window 152, and the slave camera B window 153 has been touched, the controller unit 11 suspends the display of the through-image in the camera (selected camera) in the selected window in step S115B. That is, the control unit 11 fixes the display of the through-image in the selected camera. The controller unit 11 then judges in step S115C whether the display of the through-images are suspended in all the windows. Here, when judging that the display has not yet been suspended in all the windows, the controller unit 11 ends the processing in this combination photograph generation subroutine, and returns the processing to the upper routine.

On the contrary, when judging in step S115C that the display has been suspended in all the windows, the controller unit 11 records, as a still image file in the image recording unit 14, the combination photograph which is displayed on the display unit 15 and in which the through-images are superimposed or laid out by the composing unit 111 in step S115D. Therefore, the still image of this combination photograph has the size of the through-image in the master camera, and the images of the through-images in the slave cameras therein are further reduced than the received through-image.

If the combination photograph is recorded in this way, the controller unit 11 ends the combination photograph mode in step S115E. Further, in step S115F, the controller unit 11 resumes the display of the through-images in all of the master camera window 151, the slave camera A window 152, and the slave camera B window 153. The controller unit 11 then ends the processing in this combination photograph generation subroutine, and returns the processing to the upper routine.

When judging in step S112 that the instruction to end the recording of the first sequential images has been issued by the user's operation on the operation unit 12, the controller unit 11 then advances the processing to step S116. The controller unit 11 ends the recording of the first sequential images in the image recording unit 14 in step S116, and sends an end request to the slave cameras A and B via the wireless communication unit 16 in step S117. The controller unit 11 then returns the processing to step S103.

Meanwhile, in step S207, the controller unit 21 of the slave camera A judges that the end request from the master camera has been received by the wireless communication unit 26 in response to the sending of the end request from the master camera in step S117, and the controller unit 21 advances the processing to step S208. In step S208, the controller unit 21 ends the recording of the second sequential images in the image recording unit 24. The controller unit 21 then returns the processing to step S203.

Similarly, in step S307, the controller unit 31 of the slave camera B judges that the end request from the master camera has been received by the wireless communication unit 36 in response to the sending of the end request from the master camera in step S117, and the controller unit 31 advances the processing to step S308. In step S308, the controller unit 31 ends the recording of the second sequential images in the image recording unit 34. The controller unit 31 then returns the processing to step S303.

Thus, if additional first and second sequential images need to be formed, the processing described above can be repeated.

When judging in step S103 that the instruction to start the moving image connection has been issued by the user's operation on the operation unit 12, the controller unit 11 of the master camera advances the processing to step S118. In step S118, the controller unit 11 sends a connection request to the slave cameras A and B via the wireless communication unit 16. The controller unit 11 then advances the processing to step S119. In step S119, the controller unit 11 executes a moving image connection subroutine for connecting the first sequential images and the second sequential images. Details of the processing in the moving image connection subroutine will be described later. After ending the processing in the moving image connection subroutine, the controller unit 11 advances the processing to step S120. In step S120, the controller unit 11 disconnects the wireless connection to the slave cameras by the wireless communication unit 16. The processing in this cooperation mode is then ended.

Meanwhile, in step S203, the controller unit 21 of the slave camera A judges that the connection request from the master camera has been received by the wireless communication unit 26 in response to the sending of the connection request from the master camera in step S118, and the controller unit 21 advances the processing to step S209. In step S209, the controller unit 21 executes a moving image send subroutine. Details of the processing in the moving image send subroutine will be described later. After ending the processing in the moving image send subroutine, the controller unit 21 advances the processing to step S210. In step S210, the controller unit 21 disconnects the wireless connection to the master camera by the wireless communication unit 26. The controller unit 21 then ends the processing in this cooperation mode.

Similarly, in step S303, the controller unit 31 of the slave camera B judges that the connection request from the master camera has been received by the wireless communication unit 36 in response to the sending of the connection request from the master camera in step S118, and the controller unit 31 advances the processing to step S309. In step S309, the controller unit 31 executes a moving image send subroutine. After ending the processing in the moving image send subroutine, the controller unit 31 advances the processing to step S310. In step S310, the controller unit 31 disconnects the wireless connection to the master camera by the wireless communication unit 36. The controller unit 31 then ends the processing in this cooperation mode.

Figure 11:
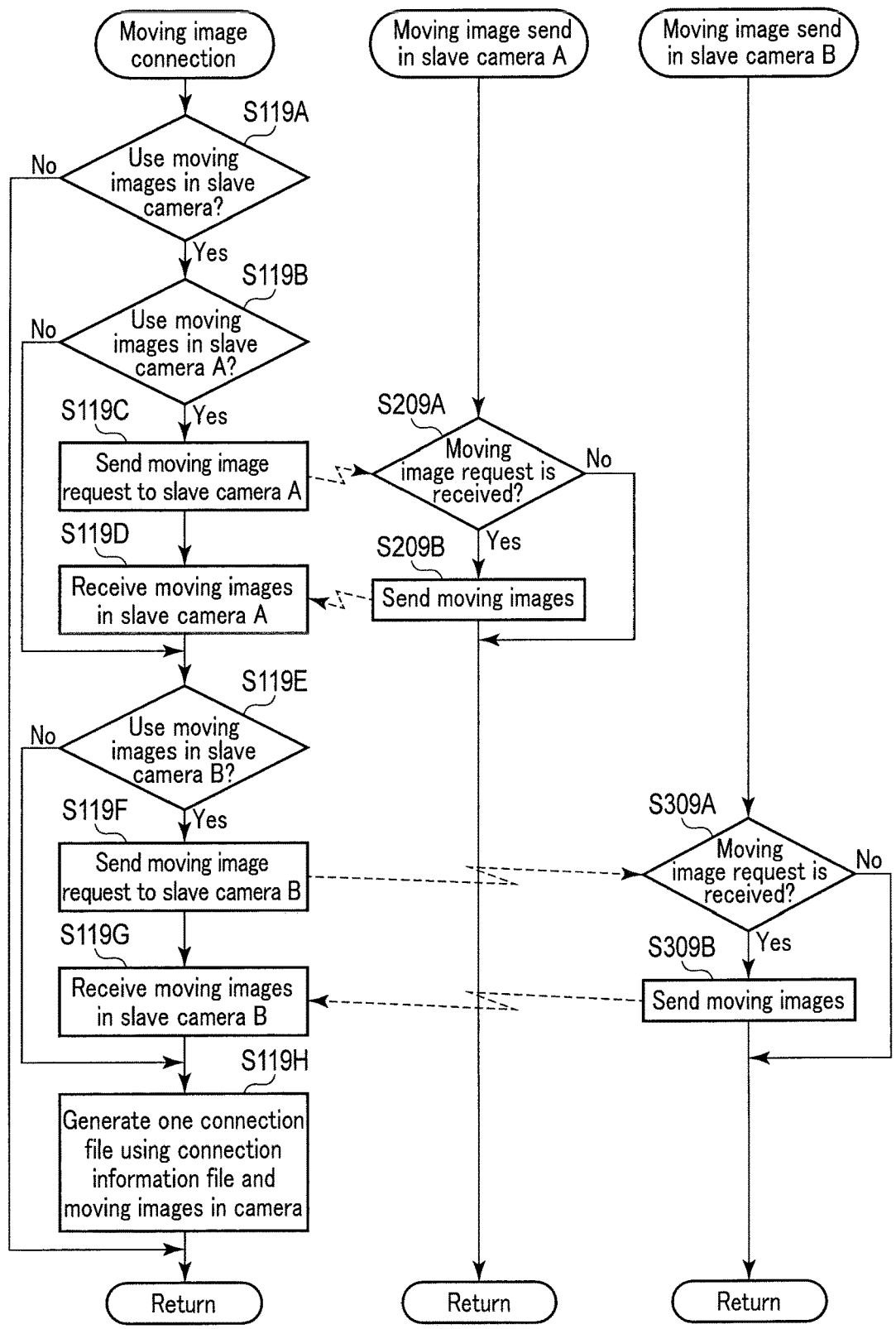
FIG. 11 is a flowchart showing an example of a moving image connection subroutine during the master camera operation and a moving image send subroutine during the slave camera operations according to the first embodiment.

Here, the moving image connection subroutine in step S119 in the master camera and the moving image send subroutine in steps S209 and S309 in the slave cameras are described with reference to FIG. 11.

The controller unit 11 of the master camera which executes the moving image connection subroutine first judges in step S119A with reference to the connection information file 171 stored in the storage unit 17 whether to use the moving images in the slave cameras. Here, when judging that the moving images in the slave cameras are not used, the controller unit 11 ends the processing in this moving image send subroutine, and returns the processing to the upper routine.

On the contrary, when judging that the moving images in the slave cameras are used, the controller unit 11 judges in step S119B whether to use the moving images in the slave camera A. Here, when judging that the moving images in the slave camera A are not used, the controller unit 11 advances the processing to step S119E. On the contrary, when judging that the moving images in the slave camera A are used, the controller unit 11 specifies the second sequential images to be obtained from the slave camera A from the connection information file 171 which is the backdating tag, and sends a moving image request including its file name to the slave camera A by the wireless communication unit 16 in step S119C. When multiple sets of second sequential images need to be obtained from the slave camera A, the controller unit 11 sends a moving image request including their file names.

In step S209A, the controller unit 21 of the slave camera A which executes the moving image send subroutine judges whether the moving image request from the master camera has been received by the wireless communication unit 26. Here, when judging that the moving image request has not been received from the master camera, the controller unit 21 ends the processing in this moving image send subroutine, and returns the processing to the upper routine. On the contrary, when judging that the moving image request has been received from the master camera, the controller unit 21 reads, from the image recording unit, the second sequential images having the file name requested to be sent by the master camera, and sends the second sequential images to the master camera by the wireless communication unit 26 in step S209B. Here, when the sending request includes multiple file names, the controller unit 21 reads and sends multiple sets of second sequential images. The controller unit 21 then ends the processing in this moving image send subroutine, and returns the processing to the upper routine.

In step S119D, the controller unit 11 of the master camera receives the second sequential images sent from the slave camera A by the wireless communication unit 16, and saves the second sequential images in the image recording unit 14. Here, when multiple sets of second sequential images are sent, the controller unit 11 saves each set of second sequential images in the image recording unit 14. The controller unit 11 then advances the processing to step S119E.

In step S119E, the controller unit 11 judges whether to use the moving images in the slave camera B. Here, when judging that the moving images in the slave camera B are not used, the controller unit 11 advances the processing to step S119H. On the contrary, when judging that the moving images in the slave camera B are used, the controller unit 11 specifies the second sequential images to be obtained from the slave camera B from the connection information file 171 which is the backdating tag, and sends a moving image request including its file name to the slave camera B by the wireless communication unit 16 in step S119F. In this instance, when multiple sets of second sequential images need to be obtained from the slave camera B, the controller unit 11 sends a moving image request including their file names.

In step S309A, the controller unit 31 of the slave camera B which executes the moving image send subroutine judges whether the moving image request from the master camera has been received by the wireless communication unit 36. Here, when judging that the moving image request has not been received from the master camera, the controller unit 31 ends the processing in this moving image send subroutine, and returns the processing to the upper routine. On the contrary, when judging that the moving image request has been received from the master camera, the controller unit 31 reads, from the image recording unit, the second sequential images having the file name requested to be sent by the master camera, and sends the second sequential images to the master camera by the wireless communication unit 36 in step S309B. Here, when the sending request includes multiple file names, the controller unit 31 reads and sends multiple sets of second sequential images. The controller unit 31 then ends the processing in this moving image send subroutine, and returns the processing to the upper routine.

In step S119G, the controller unit 11 of the master camera receives the second sequential images sent from the slave camera B by the wireless communication unit 16, and saves the second sequential images in the image recording unit 14. Here, when multiple sets of second sequential images are sent, the controller unit 11 saves each set of second sequential images in the image recording unit 14. The controller unit 11 then advances the processing to step S119H.

In step S119H, the controller unit 11 generates one connection file by the composing unit 111 using the connection information file 171 which is the backdating tag stored in the storage unit 17, the moving images in the master camera, i.e., the first sequential images recorded in the image recording unit 14, and the second sequential images from the slave cameras saved in the image recording unit 14. The controller unit 11 then ends the processing in this moving image connection subroutine, and returns the processing to the upper routine.

Figure 12:
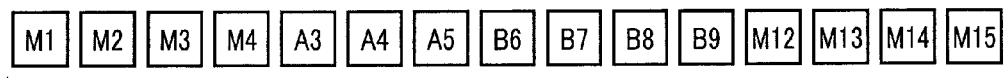
FIG. 12 is a diagram showing an example of imaging frames in a connection file created in the image acquisition apparatus serving as the master camera by the operation of the moving image connection subroutine according to the first embodiment.

In the generation of the connection file by the composing unit 111, the frame displayed in the master camera by the timing of a touch is used in the first and second sequential images. For example, the case of the example shown in FIG. 7 will be as shown in FIG. 12. That is, from the time t0 to the time before t1, images (M1 to M4) in the master camera having frame numbers 1 to 4 are selected. From the time t1 to the time before t2, images (A3 to A5) in the slave camera A having frame numbers 3 to 5 are selected. From the time t2 to the time before t3, images (B6 to B9) in the slave camera B having frame numbers 6 to 9 are selected. At and after the time t3, images (M12 . . . ) in the master camera having frame numbers 12 and the following numbers are selected.

Thus, it is possible to acquire and compose the first and second sequential images at past times by generating the connection information file 171 which is the backdating tag while acquiring first and second sequential images in cooperation.

Otherwise, the acquisition of the sequential images is only performed in cooperation, and the connection information file 171 can be created later. In this kind of usage, for example, the acquisition of the sequential images is only performed in a zoo, and editing is performed at home. In this case, the user forces the operation to end by a power-off operation in the operation unit 12, 22, or 32 while the controller unit 11 of the master camera is looping the processing in steps S103 and S104 or while the controller unit 21 or 31 of the slave camera is looping the processing in steps S203 and S204 or S303 and S304. Alternatively, the user can perform a mode switching operation for the operation unit 12, 22, or 32 so that the recording mode may be ended by interruption.

The operation in the cooperation mode is then performed later. However, in this instance, the user needs to set the camera mode to the reproduction mode rather than to the recording mode by the operation unit 12, 22, or 32. In this case, the controller unit 11 of the master camera judges in step S102 that the operation mode is not set to the recording mode, and advances the processing to step S121. The controller units 21 and 31 of the slave cameras judge in step S202 and S302 that the operation mode is not set to the recording mode, and advance the processing to step S211 and S311.

In step S121, the controller unit 11 of the master camera judges whether an instruction to start moving image connection has been issued by the user's operation on the operation unit 12. Here, when judging that the instruction to start moving image connection has been issued, the controller unit 11 advances the processing to step S136. On the contrary, when judging that the instruction to start moving image connection has not been issued, the controller unit 11 advances the processing to step S122. In step S122, the controller unit 11 judges whether an instruction to start the reproduction of the first sequential images has been issued by the user's operation on the operation unit 12. Here, when judging that the instruction to start the reproduction of the first sequential images has not been issued, the controller unit 11 returns the processing to step S121. Thus, the master camera waits until some instruction from the user is issued. In this instance, the controller unit 11 displays, on the display unit 15, a list of reproducible first sequential images recorded in the image recording unit 14.

Meanwhile, in step S211, the controller unit 21 of the slave camera A judges whether a connection request from the master camera has been received by the wireless communication unit 26. Here, when judging that the connection request has been received, the controller unit 21 advances the processing to step S217. On the contrary, when judging that the connection request has not been received, the controller unit 21 advances the processing to step S212. In step S212, the controller unit 21 judges whether a reproduction request from the master camera has been received by the wireless communication unit 26. Here, when judging that the reproduction request has not been received, the controller unit 21 returns the processing to step S211. Thus, the slave camera A waits until some request from the master camera is received. In this instance, the controller unit 21 displays, on the display unit 25, information that the slave camera A is waiting.

Similarly, in step S311, the controller unit 31 of the slave camera B judges whether a connection request from the master camera has been received by the wireless communication unit 36. Here, when judging that the connection request has been received, the controller unit 31 advances the processing to step S317. On the contrary, when judging that the connection request has not been received, the controller unit 31 advances the processing to step S312. In step S312, the controller unit 31 judges whether a reproduction request from the master camera has been received by the wireless communication unit 36. Here, when judging that the reproduction request has not been received, the controller unit 31 returns the processing to step S311. Thus, the slave camera B waits until some request from the master camera is received. In this instance, the controller unit 31 displays, on the display unit 35, information that the slave camera B is waiting.

When judging in step S122 that the instruction to start the reproduction of one of the first sequential images has been issued by the user's operation on the operation unit 12, the controller unit 11 of the master camera advances the processing to step S123. In step S123, the controller unit 11 sends a reproduction request to the slave cameras A and B via the wireless communication unit 16. This reproduction request includes the time stamp of the first sequential images selected by the user. In step S124, the controller unit 11 starts a reproduction operation. This reproduction operation is processing for reading the first sequential images from the image recording unit 14, generating a through-image corresponding to the first sequential images, and displaying the through-image on the display unit 15. The controller unit 11 then advances the processing to step S125.

Meanwhile, in step S212, the controller unit 21 of the slave camera A judges that the reproduction request from the master camera has been received by the wireless communication unit 26 in response to the sending of the reproduction request from the master camera in step S123, and the controller unit 21 advances the processing to step S213. In step S213, the controller unit 21 starts the reproduction operation. This reproduction operation is processing for reading the second sequential images from the image recording unit 24, generating a through-image corresponding to the second sequential images, and displaying the through-image on the display unit 25, in accordance with the time stamp of the first sequential images included in the reproduction request. In step S214, the controller unit 21 sends, as metadata, the delay amount related to the processing from the reading of the second sequential images from the image recording unit 24 to the completion of the communication of the corresponding through-image by the wireless communication unit 26, to the master camera by the wireless communication unit 26 together with the through-image. Therefore, the sequential through-images that are sent to the master camera from the slave camera A are range specifying sequential images corresponding to the second sequential images, and are smaller in communication amount than the second sequential images. The controller unit 21 then advances the processing to step S215.

Similarly, in step S312, the controller unit 31 of the slave camera B judges that the reproduction request from the master camera has been received by the wireless communication unit 36 in response to the sending of the reproduction request from the master camera in step S123, and the controller unit 31 advances the processing to step S313. In step S313, the controller unit 31 starts the reproduction operation. This reproduction operation is processing for reading the second sequential images from the image recording unit 34, generating a through-image corresponding to the second sequential images, and displaying the through-image on the display unit 35, in accordance with the time stamp of the first sequential images included in the reproduction request. In step S314, the controller unit 31 sends, as metadata, the delay amount related to the processing from the reading of the second sequential images from the image recording unit 34 to the completion of the communication of the corresponding through-image by the wireless communication unit 36, to the master camera by the wireless communication unit 36 together with the through-image. Therefore, the sequential through-images that are sent to the master camera from the slave camera B are range specifying sequential images corresponding to the second sequential images, and are smaller in communication amount than the second sequential images. The controller unit 31 then advances the processing to step S315.

In step S125, the controller unit 11 of the master camera receives the through-image from the slave camera A by the wireless communication unit 16. The controller unit 11 composes the received through-image from the slave camera A with the through-image in this master camera by the composing unit 111 as a through-image serving as a second display image to be displayed on the display unit 15. As a result, the controller unit 11 can display the through-image received from the slave camera A on the display unit 15 simultaneously with the through-image in this master camera. At the same time, the controller unit 11 also updates the slave camera A display delay value. Similarly, in step S126, the controller unit 11 receives the through-image from the slave camera B by the wireless communication unit 16. The controller unit 11 composes the received through-image from the slave camera B with the through-image in this master camera by the composing unit 111 as a through-image serving as a second display image to be displayed on the display unit 15. As a result, the controller unit 11 can display the through-image received from the slave camera B on the display unit 15 simultaneously with the through-image in this master camera. That is, the received two through-images are displayed on the display unit 15 simultaneously with the through-image in this master camera. At the same time, the controller unit 11 also updates a slave camera B display delay value. The controller unit 11 then advances the processing to step S127.

In step S127, the controller unit 11 judges whether the camera is set to the combination photograph mode. Here, when judging that the camera is not set to the combination photograph mode, the controller unit 11 advances the processing to step S128. In step S128, the controller unit 11 judges whether the combination photograph generation instruction button 154 has been touched, that is, whether the position corresponding to the combination photograph generation instruction button 154 in the touch screen of the operation unit 12 has been touched. When judging that the combination photograph generation instruction button 154 has not been touched, the controller unit 11 further judges in step S129 whether one of the master camera window 151, the slave camera A window 152, and the slave camera B window 153 has been touched. That is, the controller unit 11 judges whether the position corresponding to one of the windows in the touch screen of the operation unit 12 has been touched. Here, when judging that the window has not been touched, the controller unit 11 advances the processing to step S130. In step S130, the controller unit 11 judges whether an instruction to end the reproduction of the first sequential images has been issued by the user's operation on the operation unit 12. When judging that the instruction to end the recording of the first sequential images has not yet been issued, the controller unit 11 returns the processing to step S125.

In step S215, the controller unit 21 of the slave camera A judges whether an end request from the master camera has been received by the wireless communication unit 26. When judging that the end request has not been received, the controller unit 21 returns the processing to step S214.

Similarly, in step S315, the controller unit 31 of the slave camera B judges whether an end request from the master camera has been received by the wireless communication unit 36. When judging that the end request has not been received, the controller unit 31 returns the processing to step S314.

When judging in step S129 that one of the master camera window 151, the slave camera A window 152, and the slave camera B window 153 has been touched, the controller unit 11 of the master camera advances the processing to step S131. In step S131, the controller unit 11 executes the connection information file generation subroutine. In this subroutine, the same operation as that in the connection information file generation subroutine in step S113 described with reference to FIG. 8 is performed. The controller unit 11 then advances the processing to step S130.

When judging in step S128 that the combination photograph generation instruction button 154 has been touched, the controller unit 11 advances the processing to step S132. In step S132, the controller unit 11 sets the camera to the combination photograph mode. In step S133, the controller unit 11 executes the combination photograph generation subroutine. In this subroutine, the same operation as that in the combination photograph generation subroutine in step S115 described with reference to FIG. 10 is performed. When judging in step S127 that the camera is set to the combination photograph mode, the controller unit 11 also advances the processing to step S133, and executes the combination photograph generation subroutine. The controller unit 11 then returns the processing to step S125.

When judging in step S130 that the instruction to end the reproduction of the first sequential images has been issued by the user's operation on the operation unit 12, the controller unit 11 then advances the processing to step S134. The controller unit 11 ends the reproduction of the first sequential images in step S134, and sends an end request to the slave cameras A and B via the wireless communication unit 16 in step S135. The controller unit 11 then returns the processing to step S121.

Meanwhile, in step S215, the controller unit 21 of the slave camera A judges that the end request from the master camera has been received by the wireless communication unit 26 in response to the sending of the end request from the master camera in step S135, and the controller unit 21 advances the processing to step S216. In step S216, the controller unit 21 ends the reproduction of the second sequential images. The controller unit 21 then returns the processing to step S211.

Similarly, in step S315, the controller unit 31 of the slave camera B judges that the end request from the master camera has been received by the wireless communication unit 36 in response to the sending of the end request from the master camera in step S135, and the controller unit 31 advances the processing to step S316. In step S316, the controller unit 31 ends the reproduction of the second sequential images. The controller unit 31 then returns the processing to step S311.

If additional first and second sequential images need to be formed accordingly, the processing described above can be repeated.

When judging in step S121 that the instruction to start the moving image connection has been issued by the user's operation on the operation unit 12, the controller unit 11 of the master camera advances the processing to step S136. In step S136, the controller unit 11 sends a connection request to the slave cameras A and B via the wireless communication unit 16. The controller unit 11 then advances the processing to step S137. In step S137, the controller unit 11 executes the moving image connection subroutine for connecting the first sequential images and the second sequential images. In this subroutine, the same operation as that in the moving image connection subroutine in step S119 described with reference to FIG. 11 is performed. The controller unit 11 then advances the processing to step S138. In step S138, the controller unit 11 disconnects the wireless connection to the slave cameras by the wireless communication unit 16. The controller unit 11 then ends the processing in this cooperation mode.

Meanwhile, in step S211, the controller unit 21 of the slave camera A judges that the connection request from the master camera has been received by the wireless communication unit 26 in response to the sending of the connection request from the master camera in step S136, and the controller unit 21 advances the processing to step S217. In step S217, the controller unit 21 executes the moving image send subroutine. In this subroutine, the same operation as that in the moving image send subroutine in step S209 described with reference to FIG. 11 is performed. The controller unit 21 then advances the processing to step S218. In step S218, the controller unit 21 disconnects the wireless connection to the master camera by the wireless communication unit 26. The controller unit 21 then ends the processing in this cooperation mode.

Similarly, in step S311, the controller unit 31 of the slave camera B judges that the connection request from the master camera has been received by the wireless communication unit 36 in response to the sending of the connection request from the master camera in step S136, and the controller unit 31 advances the processing to step S317. In step S317, the controller unit 31 executes the moving image send subroutine. The controller unit 31 then advances the processing to step S318. In step S318, the controller unit 31 disconnects the wireless connection to the master camera by the wireless communication unit 36. The controller unit 31 then ends the processing in this cooperation mode.

Thus, it is possible to compose the first and second sequential images by generating the connection information file 171 which is the backdating tag while reproducing the first and second sequential images in cooperation.

As described above, the image acquisition apparatus 10 according to the present embodiment includes the imager unit 13 which generates first sequential images by imaging, and the wireless communication unit 16 serving as a communication unit which receives, from at least another image acquisition apparatus 20 or 30, a through-image as range specifying sequential images that correspond to second sequential images generated by imaging therein and that are smaller in communication amount than the second sequential images. The image acquisition apparatus 10 according to the present embodiment further includes the display unit 15 which displays the through-images as first display images corresponding to the first sequential images simultaneously with the through-images as second display images corresponding to the received range specifying sequential images, and the operation unit 12 which receives a specified range that is a range in the second sequential images specified by the user operation based on the through-image displayed on the display unit 15. The image acquisition apparatus 10 according to the present embodiment further includes the controller unit 11 which causes the wireless communication unit 16 to receive the second sequential images including at least the specified range from the other image acquisition apparatus 20 or 30. By having such a configuration, the image acquisition apparatus 10 according to the present embodiment can function as the master camera.

The image acquisition apparatus 20 or 30 according to the present embodiment includes the wireless communication unit 26 or 36 as a communication unit which communicates with the other image acquisition apparatus 10, the imager unit 23 or 33 which generates sequential images by imaging, and the image recording unit 24 or 34 as a recording unit which records the sequential images. The image acquisition apparatus 20 or 30 according to the present embodiment further includes the controller unit 21 or 31 which generates the through-images as range specifying sequential images that correspond to the sequential images and that are smaller in communication amount than the sequential images and then sends the through-images to the other image acquisition apparatus 10 by the wireless communication unit 26 or 36 in response to a request to send the range specifying sequential images from the other image acquisition apparatus 10 and which sends the recorded sequential images to the other image acquisition apparatus 10 by the wireless communication unit 26 or 36 in response to a request to send the sequential images from the other image acquisition apparatus 10. By having such a configuration, the image acquisition apparatus 20 or 30 according to the present embodiment can function as the slave camera.

The image acquisition system according to the first embodiment causes one of the image acquisition apparatuses 10, 20, and 30, for example, the image acquisition apparatus 10 to function as the master camera (master image acquisition apparatus) including the imager unit 13 which generates first sequential images by imaging, and causes the other image acquisition apparatuses 20 and 30 to function as the slave cameras (slave image acquisition apparatuses) including the imager units 23 and 33 as second imager units which generate second sequential images by imaging. The image acquisition apparatus 10 as the master camera further includes the wireless communication unit 16 as a first communication unit which communicates with the at least one slave camera. The image acquisition apparatuses 20 and 30 further respectively include the wireless communication units 26 and 36 as second communication units which communicate with the master camera, and the image recording units 24 and 34 which record the second sequential images. The image acquisition apparatuses 20 and 30 further respectively include the controller units 21 and 31 as range specifying sequential image sending units which generate a through-image as range specifying sequential images that correspond to the second sequential images and that are smaller in communication amount than the second sequential images and then send the through-image to the master camera by the wireless communication units 26 and 36. The master camera further includes the display unit 15 which displays the through-images as first display images corresponding to the first sequential images simultaneously with through-images as second display images corresponding to the range specifying sequential images received by the wireless communication unit 16, and the operation unit 12 which receives a specified range that is a range in the second sequential images specified by the user operation based on the through-image displayed on the display unit 15. The master camera further includes the controller unit 11 as a sequential image sending request unit which sends a request to send the second sequential images including at least the specified range to the at least one slave camera by the wireless communication unit 16. The at least one slave camera further includes the controller unit 21 or 31 as sequential image sending unit which sends the recorded second sequential images including at least the specified range to the master image acquisition apparatus by the wireless communication unit 26 or 36 in response to a request to send the second sequential images from the master camera. The master camera receives the second sequential images including at least the specified range from the at least one slave camera.

Thus, according to the present embodiment, instead of the second sequential images generated by the slave camera by imaging, the corresponding through-image which is the range specifying sequential image smaller in communication amount than the second sequential images is communicated and presented to the user by the master camera. In this way, the user can specify a necessary period in the second sequential images, and the second sequential images are acquired later by communication, so that the specified range in the second sequential images can be used.

That is, the composing unit 111 of the controller unit 11 as an image composing unit of the master camera creates images collected into one file by using the first sequential images recorded in the image recording unit 14 as a recording unit for recording the first sequential images and using a part of the second sequential images received from the slave camera corresponding to the specified range. In this case, the composing unit 111 uses the part of the received second sequential images corresponding to the specified range in consideration of the display delay value which ranges from the imaging in the slave camera to the display of the through-image as the second display image in the display unit 15 of the master camera and which has been recorded in the connection information file 171 that is the backdating tag stored in the storage unit 17. According to this configuration, the composing unit 111 can correctly use the specified range in the second sequential images by the backdating tag. Here, the composing unit 111 creates the sequential images as images collected into one file by replacing a part of the first sequential images corresponding to the specified range with the second sequential images.

The controller unit 11 of the master camera functions as a sending unit which sends a recording request to the slave cameras by the wireless communication unit 16 as a request to generate the second sequential images in response to the start of the generation of the first sequential images in the imager unit 13. Thus, the recording timing of the sequential images in the master camera and the slave cameras can be the same.

The controller unit 11 of the master camera also functions as a sending unit which sends, to the slave camera in response to the display, that is, reproduction of the through-image of the first sequential images recorded in the image recording unit 14, a reproduction request corresponding to the timing of the display as a request to send the through-image of the second sequential images recorded in the image recording units 24 and 34. As a result, a range in the second sequential images can be specified during reproduction as well.

Furthermore, the master camera receives, by the operation unit 12, specified still image recording timing for each through-image specified by the user operation based on the through-images in the master camera and the slave cameras displayed on the display unit 15. The composing unit 111 then forms one still image by combining the through-image of the first sequential images in the specified first still image recording timing with the through-image of the second sequential images in the specified second still image recording timing. Consequently, a combination photograph can be created.

Now, a second embodiment is described. The differences between the first embodiment and the second embodiment are described here, and the same parts are provided with the same reference signs and are not described.

In the present second embodiment, low rate sequential images which are formed by extracting frame image data constituting the second sequential images in every other predetermined frame and which have a low frame rate are used as a range specifying sequential images to be sent to the master camera from the slave cameras. In this case, parts of the master camera and the slave cameras of the image acquisition apparatuses shown in FIG. 4A to FIG. 4F are modified as shown in FIG. 13A to FIG. 13C.

Figure 13A:
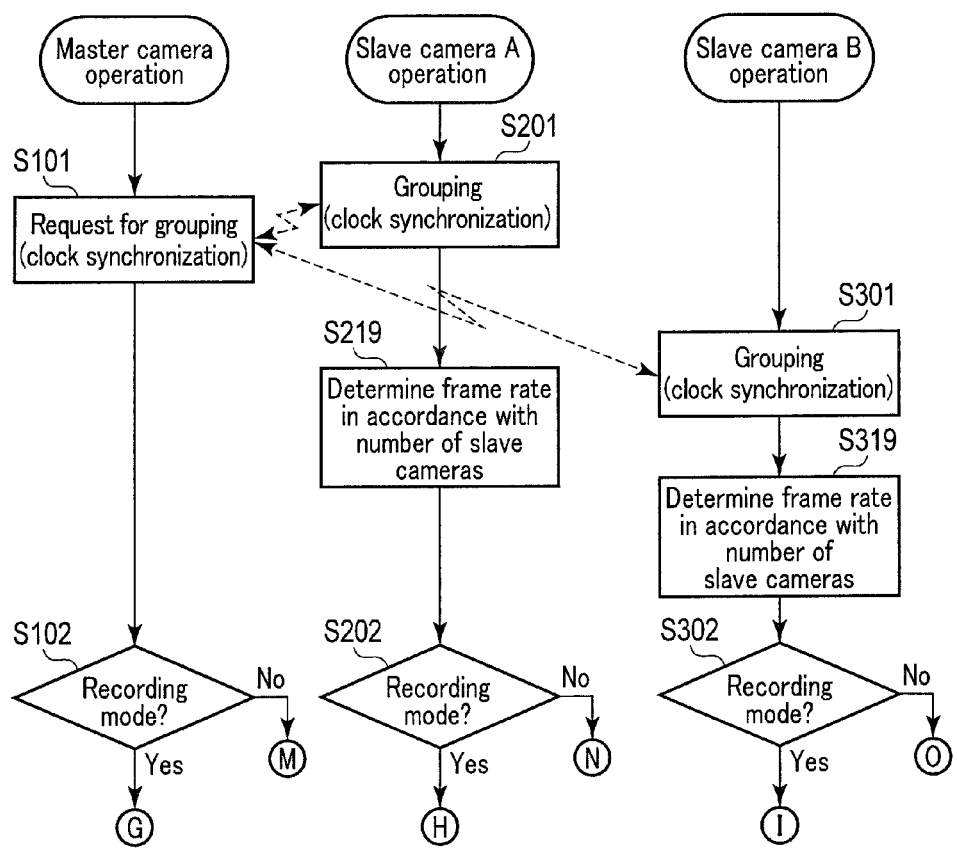
FIG. 13A is a diagram showing a first modified part of the flowchart in FIG. 4A, in a flowchart showing examples of the master camera operation and the slave camera operations in the image acquisition apparatuses in the image acquisition system according to a second embodiment of the present invention.

That is, as shown in FIG. 13A, in step S219 provided between step S201 and step S202, the controller unit 21 of the slave camera A determines a frame rate in accordance with the number of slave cameras. Similarly, in step S319 provided between step S301 and step S302, the controller unit 31 of the slave camera B determines a frame rate in accordance with the number of slave cameras. The number of slave cameras may be reported to each of the slave cameras from the master camera at the time of grouping, or may be detected in the slave cameras.

Figure 13B:
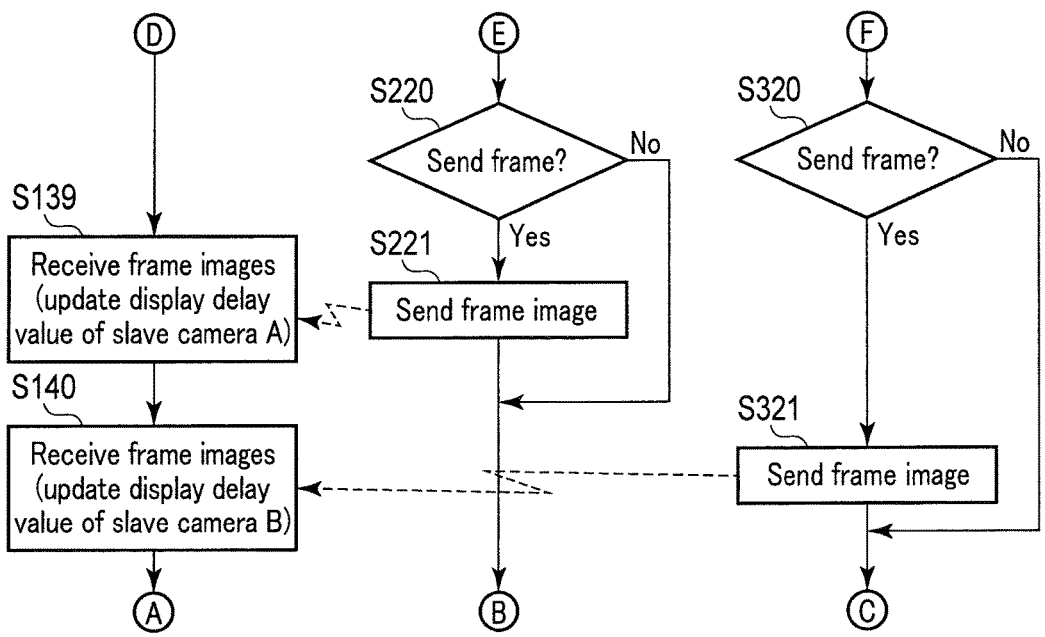
FIG. 13B is a diagram showing a second modified part of the flowchart in FIG. 4A, in a flowchart showing examples of the master camera operation and the slave camera operations in the image acquisition apparatuses in the image acquisition system according to the second embodiment.
Figure 13C:
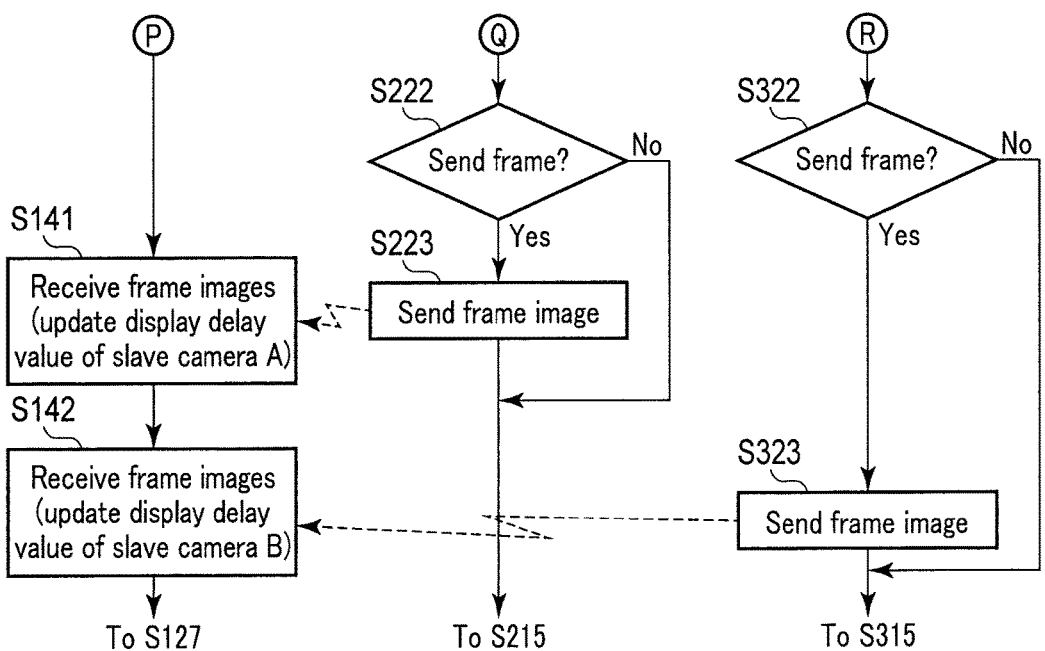
FIG. 13C is a diagram showing a third modified part of the flowchart in FIG. 4A, in a flowchart showing examples of the master camera operation and the slave camera operations in the image acquisition apparatuses in the image acquisition system according to the second embodiment.

As shown in FIG. 13B, the operations in steps S107 and S108 regarding the master camera are replaced by steps S139 and S140. The operation in step S206 regarding the slave camera A is replaced by steps S220 and S221. The operation in step S306 regarding the slave camera B is replaced by steps S320 and S321.

That is, in the slave camera A, when the recording of the second sequential images is started, the controller unit 21 judges in step S220 whether now is the timing for sending frame image data, on the basis of the frame rate determined in step S129. Here, when judging that now is not the timing, the controller unit 21 advances the processing to step S207. On the contrary, when judging that now is the timing for sending the frame image data, the controller unit 21 sends the frame image data from the imager unit 23 to the master camera by the wireless communication unit 26 in step S221. In this case, the frame image data may be sent after being compressed via compression technology. The controller unit 21 then advances the processing to step S207.

Similarly, in the slave camera B, when the recording of the second sequential images is started, the controller unit 31 judges in step S320 whether now is the timing for sending frame image data, on the basis of the frame rate determined in step S129. Here, when judging that now is not the timing, the controller unit 31 advances the processing to step S307. On the contrary, when judging that now is the timing for sending the frame image data, the controller unit 31 sends the frame image data from the imager unit 33 to the master camera by the wireless communication unit 36 in step S321. In this case, the frame image data may be sent after being compressed via compression technology. The controller unit 31 then advances the processing to step S307.

In step S139, the controller unit 11 of the master camera receives the frame image data from the slave camera A by the wireless communication unit 16, and processes the frame image data from the slave camera A to create a through-image. It should be understood that when the frame image data from the slave camera A is compressed in this instance, the controller unit 11 also performs decompression processing. The controller unit 11 then composes the generated through-image as a second display image to be displayed on the display unit 15 with the through-image in the master camera by the composing unit 111, and displays the second display image on the display unit 15 simultaneously with the through-image in this master camera. At the same time, the controller unit 11 also updates the slave camera A display delay value. Similarly, in step S140, the controller unit 11 receives the frame image data from the slave camera B by the wireless communication unit 16, and processes the received frame image data from the slave camera B to create a through-image. It should be understood that when the frame image data from the slave camera B is compressed in this instance, the controller unit 11 also performs decompression processing. The controller unit 11 then composes the generated through-image as a second display image to be displayed on the display unit 15 with the through-image in the master camera by the composing unit 111, and displays the second display image on the display unit 15 simultaneously with the through-image in this master camera. At the same time, the controller unit 11 also updates the slave camera B display delay value. The controller unit 11 then advances the processing to step S109.

As shown in FIG. 13C, the operations in steps S125 and S126 regarding the master camera are replaced by steps S141 and S142. The operation in step S214 regarding the slave camera A is replaced by steps S222 and S223. The operation in step S314 regarding the slave camera B is replaced by steps S322 and S323.

That is, in the slave camera A, when the reproduction of the second sequential images is started, the controller unit 21 judges in step S222 whether now is the timing for sending frame image data, on the basis of the frame rate determined in step S219. Here, when judging that now is not the timing, the controller unit 21 advances the processing to step S215. On the contrary, when judging that now is the timing for sending the frame image data, the controller unit 21 sends the frame image data for the second sequential images read from the image recording unit 24 to the master camera by the wireless communication unit 26 in step S223. In this case, the frame image data may be sent after compressed by use of a compression technology. The controller unit 21 then advances the processing to step S215.

Similarly, in the slave camera B, when the reproduction of the second sequential images is started, the controller unit 31 judges in step S322 whether now is the timing for sending frame image data, on the basis of the frame rate determined in step S319. Here, when judging that now is not the timing, the controller unit 31 advances the processing to step S315. On the contrary, when judging that now is the timing for sending the frame image data, the controller unit 31 sends the frame image data for the second sequential images read from the image recording unit 34 to the master camera by the wireless communication unit 36 in step S323. In this case, the frame image data may be sent after compressed by use of a compression technology. The controller unit 31 then advances the processing to step S315.

In step S141, the controller unit 11 of the master camera receives the frame image data from the slave camera A by the wireless communication unit 16, and processes the received frame image data from the slave camera A to create a through-image. It should be understood that when the frame image data from the slave camera A is compressed in this instance, the controller unit 11 also performs decompression processing. The controller unit 11 then composes the generated through-image as a second display image to be displayed on the display unit 15 with the through-image in the master camera by the composing unit 111, and displays the second display image simultaneously with the through-image in this master camera. At the same time, the controller unit 11 also updates the slave camera A display delay value. Similarly, in step S142, the controller unit 11 receives the frame image data from the slave camera B by the wireless communication unit 16, and processes the received frame image data from the slave camera B to create a through-image. It should be understood that when the frame image data from the slave camera B is compressed in this instance, the controller unit 11 also performs decompression processing. The controller unit 11 then composes the generated through-image as a second display image to be displayed on the display unit 15 with the through-image in the master camera by the composing unit 111, and displays the second display image on the display unit 15 simultaneously with the through-image in this master camera. At the same time, the controller unit 11 also updates the slave camera B display delay value. The controller unit 11 then advances the processing to step S127.

As described above, low-rate sequential images which are formed by extracting the second sequential images in every other predetermined frame and which have a low frame rate can be used as the range specifying sequential images.

According to the present embodiment, the images having the imaging size in the imager units 23 and 33 of the slave cameras are sent as the range specifying sequential images, so that when executing the combination photograph generation subroutine in step S115, the controller unit 11 of the master camera can obtain a combination photograph using the frame images having imaging size before formed into the through-images.

Now, a third embodiment is described. The differences between the first embodiment and the third embodiment are described here, and the same parts are provided with the same reference signs and are not described.

In the first and second embodiments, all the second sequential images are sent to the master camera from the slave cameras after ranges have been specified by the master camera. In contrast, according to the present third embodiment, parts of the second sequential images corresponding to the specified ranges are only sent to the master camera from the slave cameras. In this case, in the operations of the master camera and the slave cameras of the image acquisition apparatuses shown in FIG. 4A to FIG. 4F, some of the operations shown in FIG. 4B have only to be modified as shown in FIG. 14.

Figures 14, 15:
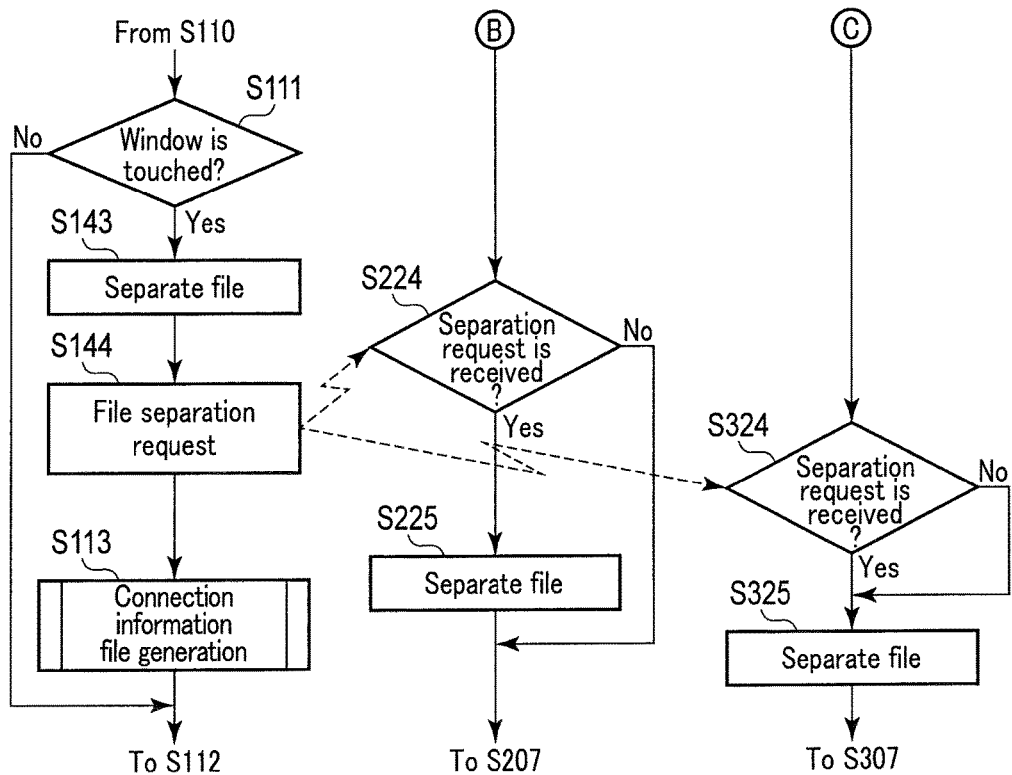
FIG. 14 is a diagram showing a modified part of the flowchart in FIG. 4B, in a flowchart showing examples of the master camera operation and the slave camera operations in the image acquisition apparatuses in the image acquisition system according to a third embodiment of the present invention.
FIG. 15 is a table showing an example of connection information files created in the image acquisition apparatus serving as the master camera by the operation of the connection information file generation subroutine according to the third embodiment.

That is, as shown in FIG. 14, when judging in step S111 that one of the master camera window 151, the slave camera A window 152, and the slave camera B window 153 has been touched, the controller unit 11 of the master camera separates the moving image file of the first sequential images recorded in the image recording unit 14 in step S143. In step S144, the controller unit 11 sends a separation request to the slave cameras by the wireless communication unit 16. The controller unit 11 then advances the processing to step S113.

Meanwhile, after sending the through-image to the master camera in step S206 by the wireless communication unit 26, the controller unit 21 of the slave camera A judges in step S224 whether the separation request from the master camera has been received by the wireless communication unit 26. When judging that the separation request has not been received, the controller unit 21 advances the processing to step S207. On the contrary, when judging that the separation request has been received, the controller unit 21 separates the moving image file in the second sequential images recorded in the image recording unit 24. The controller unit 21 then advances the processing to step S207.

Similarly, after sending the through-image to the master camera in step S306 by the wireless communication unit 36, the controller unit 31 of the slave camera B judges in step S324 whether the separation request from the master camera has been received by the wireless communication unit 36. When judging that the separation request has not been received, the controller unit 31 advances the processing to step S307. On the contrary, when judging that the separation request has been received, the controller unit 31 separates the moving image file in the second sequential images recorded in the image recording unit 34. The controller unit 31 then advances the processing to step S307.

The first and second sequential images are separated in this way, so that the first and second sequential images for each specified range are generated. The controller unit 11 of the master camera then executes the connection information file generation subroutine in step S113. As a result, the connection information file 171 shown in FIG. 15 including the file names that specify the moving image files of the separated sequential images is generated in the storage unit 17 as the backdating tag.

In the master camera and the slave cameras, the file names of the separated moving image files are given in accordance with a predetermined naming rule. Thus, the file names are stored in the connection information file 171 which is the backdating tag.

For example, at the time t0, the moving image files having a file name "MOVIE_M1.MOV" is recorded in the master camera, a file name "MOVIE_SA1.MOV" is recorded in the slave camera A, and a file name "MOVIE_SB1.MOV" is recorded in the slave camera B. Among the above, the record regarding the master camera is stored in the connection information file 171 which is the backdating tag.

If the first and second sequential images are separated in response to the touch in the slave camera A window 152 at the time t1, the moving image files are recorded under a file name "MOVIE_M2.MOV" in the master camera, under a file name "MOVIE_SA2.MOV" in the slave camera A, and under a file name "MOVIE_SB2.MOV" in the slave camera B from the time t1. Among the above, the record regarding the slave camera A is additionally stored in the connection information file 171 which is the backdating tag.

In this way, every time the first and second sequential images are separated, the file names of the moving image files recorded in the master camera and the slave cameras A and B are incremented. The record including a file name that specifies the moving image files of the sequential images corresponding to the touched window is additionally stored in the connection information file 171 which is the backdating tag.

It should be understood that any file name to be recorded in the image recording units 24 and 34 together with the separation request may be determined in the master camera without complying with the above predetermined naming rule. In this case, this file name is sent to the slave cameras from the master camera, and the slave cameras use this file name.

When executing the moving image send subroutines in steps S209 and S309, the controller units 21 and 31 of the slave cameras can only send parts in the specified range of the second sequential images recorded in the image recording units 24 and 34 that are specified by the file names included in the moving image request from the slave cameras in steps S209B and S309B.

It should be understood that the present third embodiment is also applicable when the low-rate sequential images which are formed by extracting frame image data constituting the second sequential images in every other predetermined frame and which have a low frame rate are sent as the range specifying sequential images as in the second embodiment.

In the case where the third embodiment is applied to the previously described second embodiment, when the parts of the second sequential images in the specified range are only sent from the slave cameras in steps S209B and S309B, the frame images which have been already sent as the range specifying sequential images may be omitted. In this configuration, the controller unit 11 of the master camera saves the received low-rate sequential images as the range specifying sequential images in the image recording unit 14 in steps S139 and S140. In steps S119D and S119G in the moving image connection subroutine in step S119, frame images that are not received as the low-rate sequential images in the parts of the second sequential images in the specified range are only received. In step S119H, when one connection file is generated, sequential images having the same frame rate as that at the time of imaging are generated from the frame images saved in the image recording unit 14 and the received frame images, and are then composed with the first sequential images.

Now, a fourth embodiment is described. The differences between the first embodiment and the fourth embodiment are described here, and the same parts are provided with the same reference signs and are not described.

In the first embodiment described above, the recording of the first sequential images in the master camera and the recording of the second sequential images in the slave cameras are started at the same time. In contrast, according to the present fourth embodiment, the user of the master camera can start the recording of the second sequential images in the slave cameras at a given timing. In this case, for example, in the master camera operation and the slave camera operations shown in FIG. 4A to FIG. 4F, some of the operations shown in FIG. 4A and the operations shown in FIG. 4B, FIG. 4D, and FIG. 4E have only to be modified as shown in FIG. 16A to FIG. 16D.

Figure 16A:
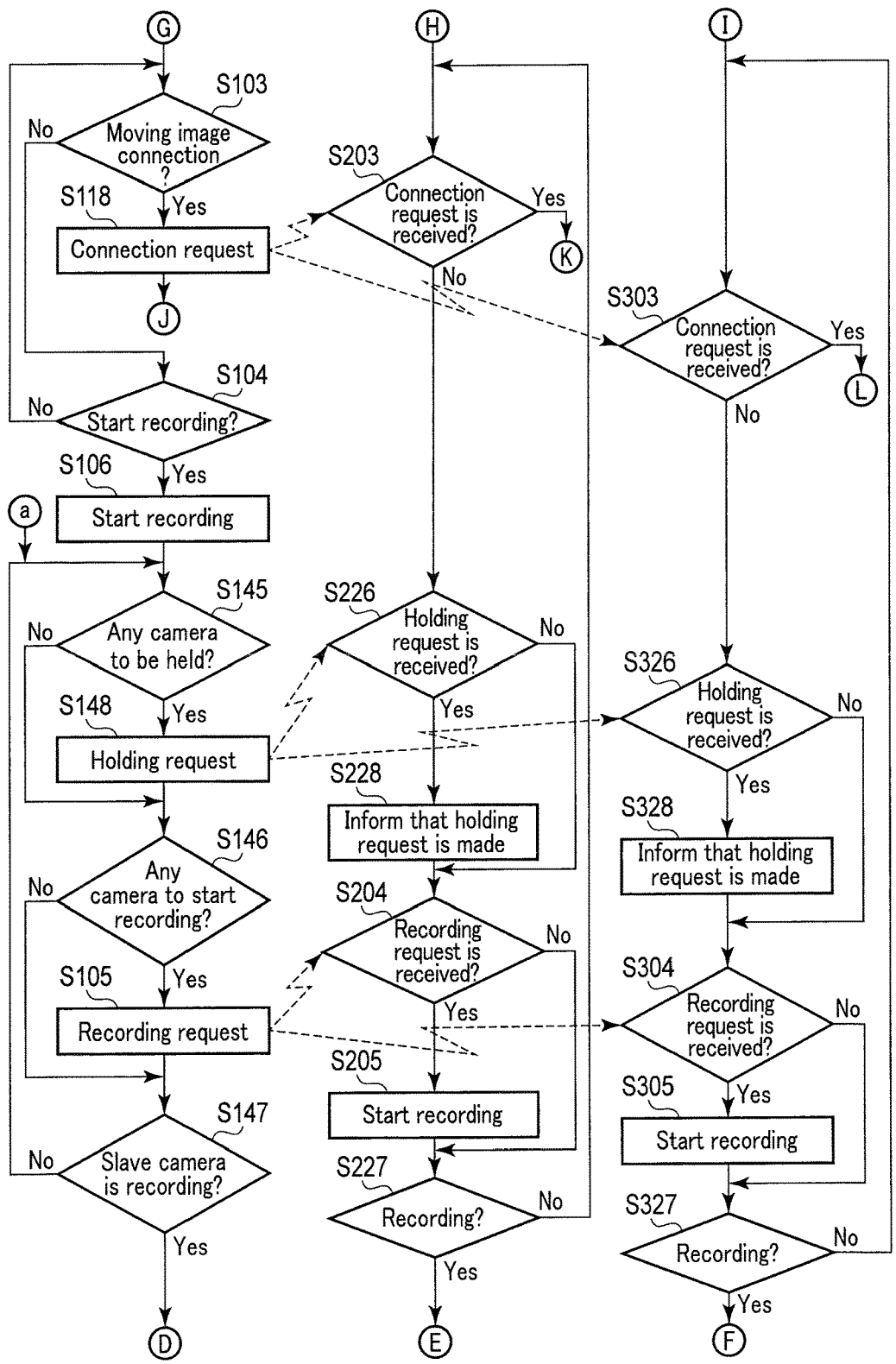
FIG. 16A is a diagram showing a modified part of the flowchart in FIG. 4A, in a flowchart showing examples of the master camera operation and the slave camera operations in the image acquisition apparatuses in the image acquisition system according to a fourth embodiment of the present invention.
Figure 16B:
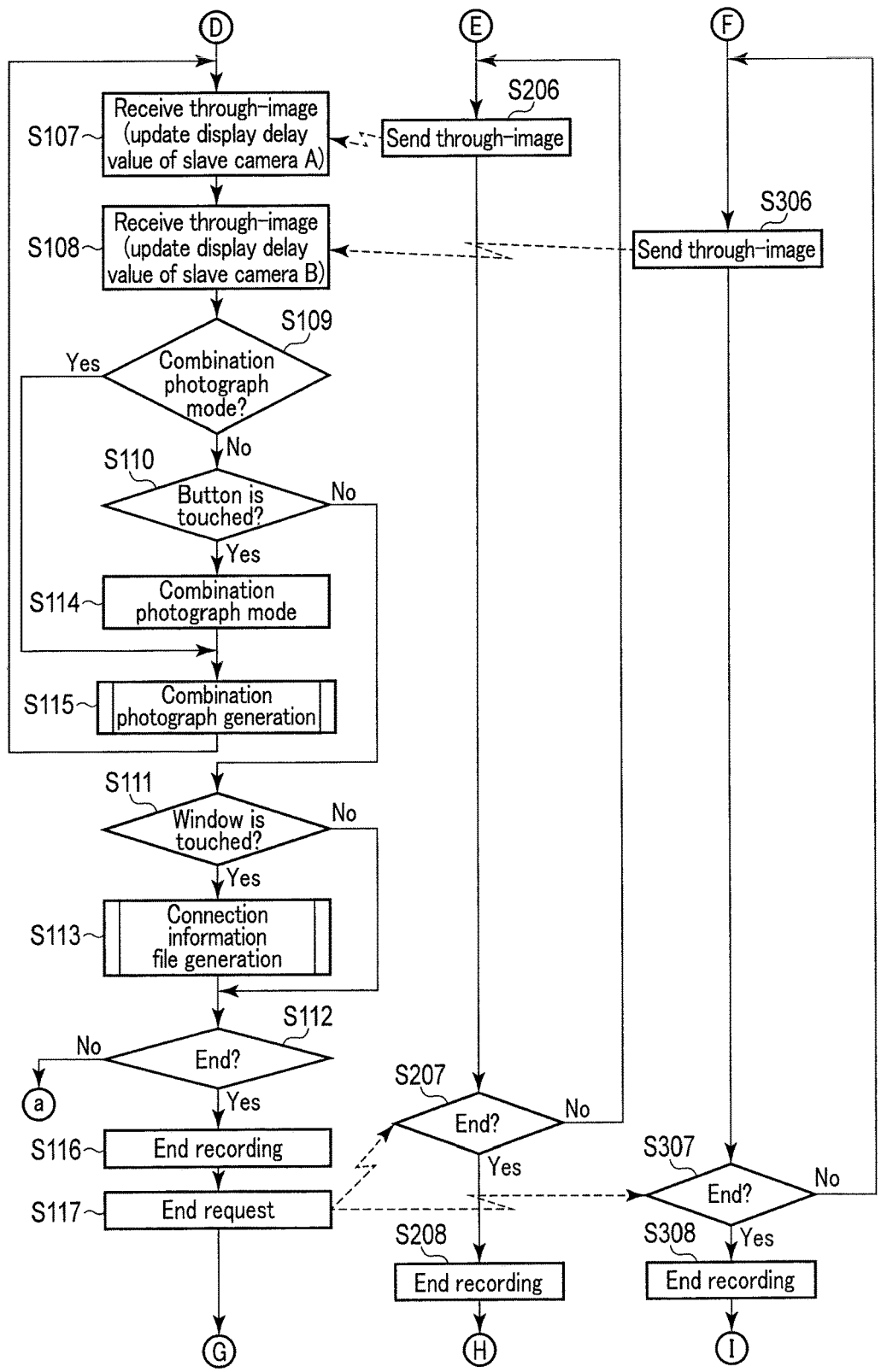
FIG. 16B is a diagram showing a modified part of the flowchart in FIG. 4B, in a flowchart showing examples of the master camera operation and the slave camera operations in the image acquisition apparatuses in the image acquisition system according to the fourth embodiment.
Figure 16D:
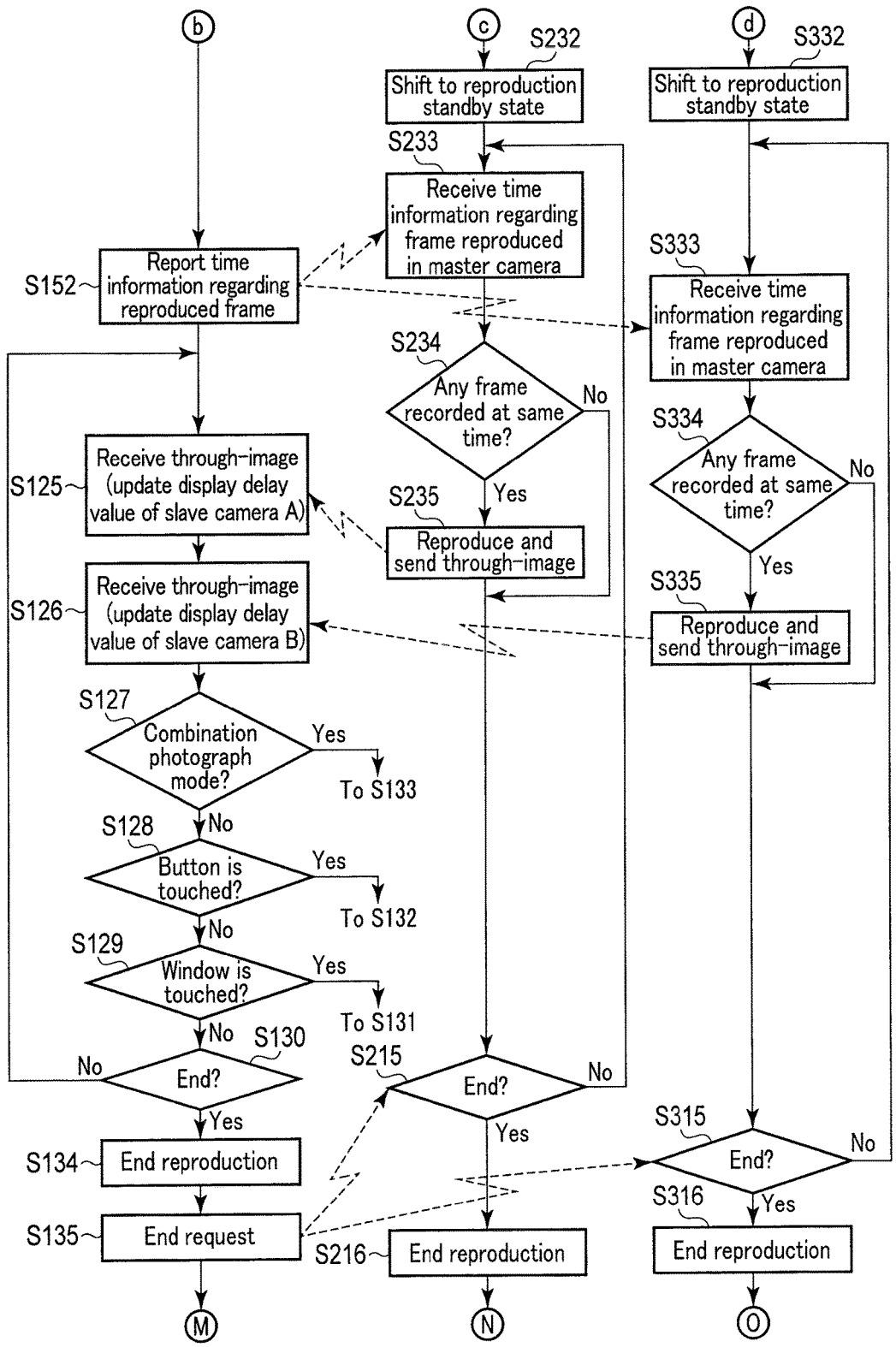
FIG. 16D is a diagram showing a modified part of the flowchart in FIG. 4D, in a flowchart showing examples of the master camera operation and the slave camera operations in the image acquisition apparatuses in the image acquisition system according to the fourth embodiment.

That is, as shown in FIG. 16A, when the operation mode is set to the recording mode, the controller unit 21 of the slave camera A judges in step S203 whether a connection request from the master camera has been received by the wireless communication unit 26. Here, when judging that the connection request has not been received, the controller unit 21 advances the processing to step S226 in the present embodiment. In step S226, the controller unit 21 judges whether a holding request from the master camera has been received by the wireless communication unit 26. Here, when judging that the holding request has not been received, the controller unit 21 advances the processing to step S204. When judging in step S204 that a recording request has not been received, the controller unit 21 advances the processing to step S227 in the present embodiment. In step S227, the controller unit 21 judges whether the second sequential images are being recorded at present. Here, when judging that the second sequential images are not being recorded, the controller unit 21 returns the processing to step S203. Thus, the slave camera A waits until a request from the master camera is received. In this instance, according to the present embodiment, imaging is not performed by the imager unit 23, so that the through-image is displayed on the display unit 25 during the wait.

Similarly, when the operation mode is set to the recording mode, the controller unit 31 of the slave camera B judges in step S303 whether a connection request from the master camera has been received by the wireless communication unit 36. Here, when judging that the connection request has not been received, the controller unit 31 advances the processing to step S326 in the present embodiment. In step S326, the controller unit 31 judges whether a holding request from the master camera has been received by the wireless communication unit 36. Here, when judging that the holding request has not been received, the controller unit 31 advances the processing to step S304. When judging in step S304 that a recording request has not been received, the controller unit 31 advances the processing to step S327 in the present embodiment. In step S327, the controller unit 31 judges whether the second sequential images are being recorded at present. Here, when judging that the second sequential images are not being recorded, the controller unit 31 returns the processing to step S303. Thus, the slave camera B waits until a request from the master camera is received. In this instance, according to the present embodiment, imaging is not performed by the imager unit 33, so that the through-image is displayed on the display unit 35 during the wait.

When judging in step S104 that the instruction to start the recording of the first sequential images has been issued by the user's operation on the operation unit 12, the controller unit 11 of the master camera advances the processing to step S106 in the present embodiment. As a result, the controller unit 11 processes image data from the imager unit 13 to generate the first sequential images, and starts the recording of the first sequential images in the image recording unit 14. In this instance, the controller unit 11 also generates a through-image corresponding to each frame image data for the first sequential images to be recorded, and displays the through-image on the display unit 15. That is, the through-image is a first display image corresponding to the first sequential images. The controller unit 11 then advances the processing to step S145 in the present embodiment. In step S145, the controller unit 11 judges whether a holding request for one of the slave cameras has been made by the user's operation on the operation unit 12, that is, whether the user requests any slave camera to be held. Here, when judging that the holding request has not been made, the controller unit 11 advances the processing to step S146. In step S146, the controller unit 11 judges whether an instruction to start the recording for one of the slave cameras has been made issued by the user's operation on the operation unit 12, that is, whether the user requests any slave camera to start recording. Here, when judging that the recording request has not been made, the controller unit 11 advances the processing to step S147. In step S147, the controller unit 11 judges whether one of the slave cameras is recording the second sequential images. Here, when judging that none of the slave cameras is recording, the controller unit 11 returns the processing to step S145.

When judging in step S145 that the holding request has not been made, the controller unit 11 advances the processing to step S148. In step S148, the controller unit 11 sends, by the wireless communication unit 16, a holding request to the slave camera designed by the user. The controller unit 11 then advances the processing to step S146.

In step S226, the controller unit 21 of the slave camera A judges that the holding request from the master camera has been received by the wireless communication unit 26 in response to the sending of the holding request from the master camera to the slave camera A in step S148, and the controller unit 21 advances the processing to step S228. In step S228, the controller unit 21 informs the user of the image acquisition apparatus 20 that the holding request has been made. This information may be displayed on the display unit 25 or may be indicated in some other way such as the turning on of an LED indicator light. Otherwise, the user may be informed by sound or vibration. If the controller unit 21 has informed that the holding request has been made in this way, the controller unit 21 advances the processing to step S204.

Similarly, the controller unit 31 of the slave camera B judges that the holding request from the master camera has been received by the wireless communication unit 36 in response to the sending of the holding request from the master camera to the slave camera B in step S148, and the controller unit 31 advances the processing to step S328. In step S328, the controller unit 31 informs the user of the image acquisition apparatus 30 that the holding request has been made. This information may be displayed on the display unit 35 or may be indicated in some other way such as the turning on of an LED indicator light. Otherwise, the user may be informed by sound or vibration. If the controller unit 31 has informed that the holding request has been made in this way, the controller unit 31 advances the processing to step S304.

When judging in step S146 that the instruction to start the recording has been issued, the controller unit 11 of the master camera advances the processing to step S105. In step S105, the controller unit 11 sends, by the wireless communication unit 16, a recording request to the slave camera designed by the user. The controller unit 11 then advances the processing to step S147.

In step S204, the controller unit 21 of the slave camera A judges that the recording request from the master camera has been received by the wireless communication unit 26 in response to the sending of the recording request from the master camera to the slave camera A in step S105, and the controller unit 21 advances the processing to step S205. In step S205, the controller unit 21 processes image data from the imager unit 23 to generate the second sequential images, and starts the recording of the second sequential images in the image recording unit 24. In this instance, the controller unit 21 also generates a through-image corresponding to the frame image data for the second sequential images to be recorded, and displays the through-image on the display unit 25. The controller unit 21 then advances the processing to step S204.

Similarly, in step S304, the controller unit 31 of the slave camera B judges that the recording request from the master camera has been received by the wireless communication unit 36 in response to the sending of the recording request from the master camera to the slave camera B in step S105, and the controller unit 31 advances the processing to step S305. In step S305, the controller unit 31 processes image data from the imager unit 33 to generate the second sequential images, and starts the recording of the second sequential images in the image recording unit 34. In this instance, the controller unit 31 also generates a through-image corresponding to the frame image data for the second sequential images to be recorded, and displays the through-image on the display unit 35. The controller unit 31 then advances the processing to step S304.

When judging in step S147 that one of the slave cameras is recording the second sequential images, the controller unit 11 of the master camera advances the processing to step S107. When judging in step S227 that the second sequential images are being recorded, the controller unit 21 of the slave camera A advances the processing to step S206. When judging in step S327 that the second sequential images are being recorded, the controller unit 31 of the slave camera B advances the processing to step S306.

The subsequent operations of the master camera and the slave cameras are as have been described in the previous first embodiment. However, according to the present fourth embodiment, when judging in step S112 that an instruction to end the recording of the first sequential images has not yet been issued by the user's operation on the operation unit 12, the controller unit 11 of the master camera returns the processing to step S145 rather than step S107. As a result, a holding request or a recording request can be made to yet another slave camera.

When judging in step S102 that the operation mode is not set to the recording mode, that is, the operation mode is set to the reproduction mode, and when further judging in step S121 that the instruction to start the moving image connection has been issued by the user's operation on the operation unit 12, the controller unit 11 of the master camera advances the processing to step S149 in the present fourth embodiment. In step S149, the controller unit 11 displays a list of reproducible moving image files of the first sequential images recorded in the image recording unit 14, and receives a file selection made by the user's operation on the operation unit 12. In step S150, the controller unit 11 then sends the recording start time and the recording end time of the selected moving image file to the slave cameras by the wireless communication unit 16.

Meanwhile, when judging in step S211 that the connection request from the master camera has not been received by the wireless communication unit 26, the controller unit 21 of the slave camera A advances the processing to step S229 in the present fourth embodiment. In step S229, the controller unit 21 receives, by the wireless communication unit 26, the recording start time and the recording end time of the reproduction file in the master camera sent in step S150. The controller unit 21 then advances the processing to step S230. In step S230, the controller unit 21 judges whether the corresponding moving image file of the second sequential images is recorded in the image recording unit 24 on the basis of the received recording start time and recording end time. Here, when judging that there is no corresponding file, the controller unit 21 advances the processing to step S231. In step S231, the controller unit 21 informs the master camera that there is no corresponding file by the wireless communication unit 26. The controller unit 21 then returns the processing to step S211.

Similarly, when judging in step S311 that the connection request from the master camera has not been received by the wireless communication unit 36, the controller unit 31 of the slave camera B advances the processing to step S329 in the present fourth embodiment. In step S329, the controller unit 31 receives, by the wireless communication unit 36, the recording start time and the recording end time of the reproduction file in the master camera sent in step S150. The controller unit 31 then advances the processing to step S330. In step S330, the controller unit 31 judges whether the corresponding moving image file of the second sequential images is recorded in the image recording unit 34 on the basis of the received recording start time and recording end time. Here, when judging that there is no corresponding file, the controller unit 31 advances the processing to step S331. In step S331, the controller unit 31 informs the master camera that there is no corresponding file by the wireless communication unit 36. The controller unit 31 then returns the processing to step S311.

In step S151, the controller unit 11 of the master camera judges whether information indicating that there is no corresponding file has been received from all the slave cameras. Here, when judging that the information indicating that there is no corresponding file has been received from all the slave cameras, the controller unit 11 returns the processing to step S121. On the contrary, when judging that the information indicating that there is no corresponding file has not been received from one of the slave cameras, the controller unit 11 advances the processing to step S124. In step S124, the controller unit 11 starts the reproduction of the moving image file of the first sequential images selected in step S149. The controller unit 11 then advances the processing to step S152 in the present fourth embodiment. In step S152, the controller unit 11 reports, by the wireless communication unit 16, time information regarding the currently reproduced frame in the first sequential images being reproduced, to the slave camera which has not received the information indicating that there is no corresponding file. The controller unit 11 then advances the processing to step S125, and performs the operations described above.

Meanwhile, when judging in step S230 that there is a corresponding file, the controller unit 21 of the slave camera A advances the processing to step S232. In step S232, the controller unit 21 shifts to a reproduction standby state for the corresponding moving image file. The controller unit 21 then advances the processing to step S233. In step S233, the controller unit 21 receives, by the wireless communication unit 26, the time information regarding the frame reproduced in the master camera reported in step S152. In step S234, the controller unit 21 then judges whether there is a frame image recorded at the same time in the moving image file in the reproduction standby state. Here, when judging that there is no such frame image, the controller unit 21 advances the processing to step S215. In step S215, the controller unit 21 judges whether an end request from the master camera has been received by the wireless communication unit 26. When judging that the end request has not been received, the controller unit 21 returns the processing to step S233. Thus, the reproduction standby state is maintained in the slave camera A.

When judging in step S234 that the there is a frame image recorded at the time indicated by the time information regarding the frame reproduced in the master camera, the controller unit 21 advances the processing to step S235. In step S235, the controller unit 21 reproduces this frame image, generates a corresponding through-image, and then sends the through-image to the master camera by the wireless communication unit 26. The controller unit 21 then advances the processing to step S215.

Similarly, when judging in step S330 that there is a corresponding file, the controller unit 31 of the slave camera B advances the processing to step S332. In step S332, the controller unit 31 shifts to a reproduction standby state for the corresponding moving image file. The controller unit 31 then advances the processing to step S333. In step S333, the controller unit 31 receives, by the wireless communication unit 36, the time information regarding the frame reproduced in the master camera reported in step S152. In step S334, the controller unit 31 then judges whether there is a frame image recorded at the same time in the moving image file in the reproduction standby state. Here, when judging that there is no such frame image, the controller unit 31 advances the processing to step S315. In step S315, the controller unit 31 judges whether an end request from the master camera has been received by the wireless communication unit 36. When judging that the end request has not been received, the controller unit 31 returns the processing to step S333. Thus, the reproduction standby state is maintained in the slave camera B.

When judging in step S334 that the there is a frame image recorded at the time indicated by the time information regarding the frame reproduced in the master camera, the controller unit 31 advances the processing to step S335. In step S335, the controller unit 31 reproduces this frame image, generates a corresponding through-image, and then sends the through-image to the master camera by the wireless communication unit 36. The controller unit 31 then advances the processing to step S315.

Figure 17:
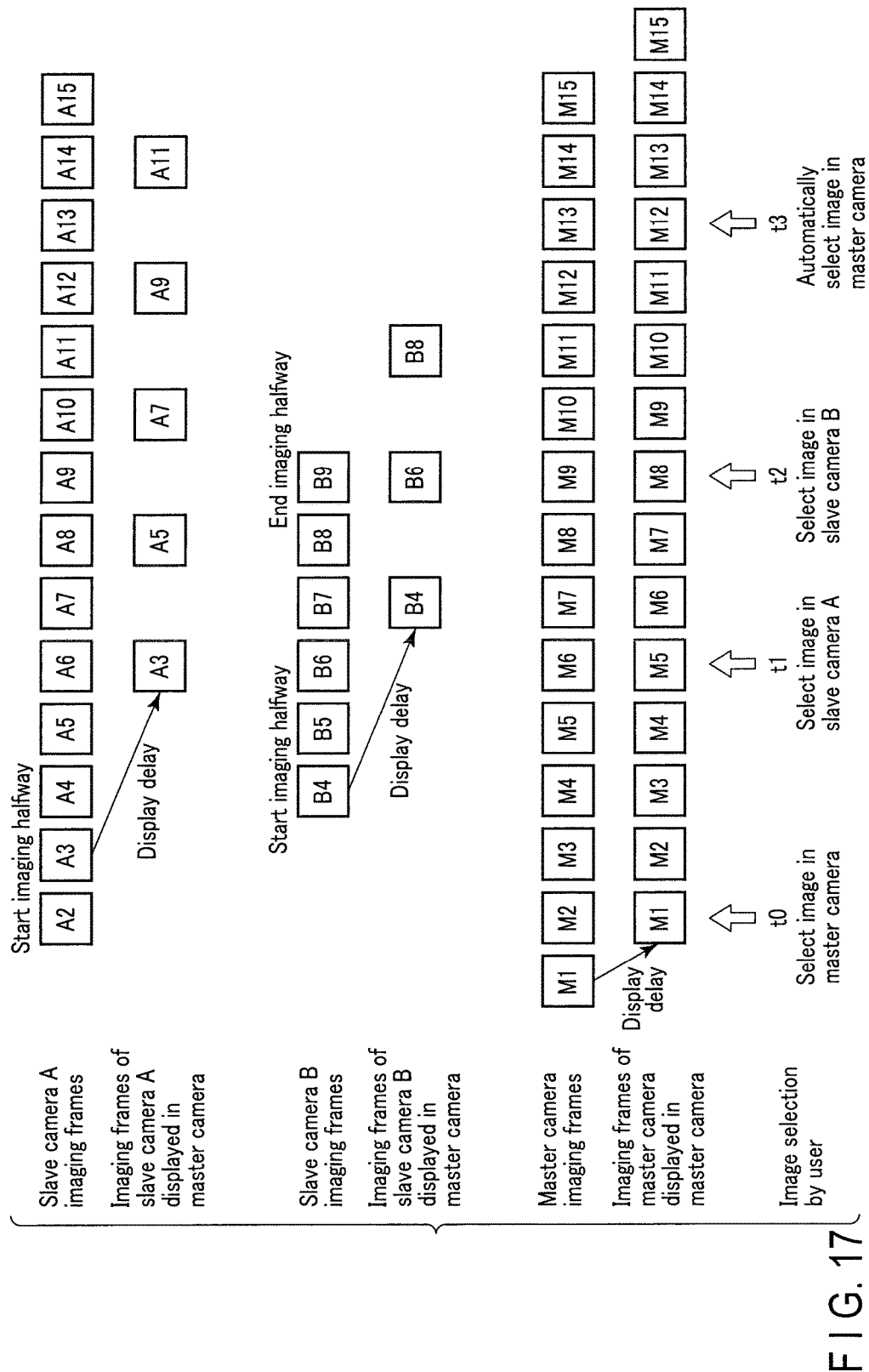
FIG. 17 is a schematic diagram showing an example of the relation between imaging frames of sequential images in the image acquisition apparatuses in the image acquisition system according to the fourth embodiment and imaging frames displayed on the display unit of the image acquisition apparatus serving as the master camera.

As a result of the operations described above, it is possible to obtain advantageous effects similar to those in the previous first embodiment even if the recording in the slave cameras is not started in accordance with the start of recording in the master camera and imaging in the slave cameras is started halfway as shown in FIG. 17.

When the recording of the second sequential images in the slave cameras is ended by the user operations in the operation units 22 and 32 at the slave cameras independently of the user operation for the master camera, the first sequential images in the master camera may be automatically selected at the time t3 as shown in FIG. 17. In the example shown in FIG. 17, an image (B9) in the slave camera B having the frame number 9 is not displayed in the master camera, but is used as a frame to be recorded in the image recording unit 34 of the slave camera B. To perform this automatic selection operation, the controller unit 11 of the master camera has only to be configured to perform the following operations. That is, when the controller unit 11 cannot receive the through-image from the slave camera in step S107 or S108, the controller unit 11 judges that the recording in this slave camera has been ended. The controller unit 11 then executes the connection information file generation subroutine in step S113 considering that the master camera window 151 has been touched.

In the present fourth embodiment, when the operation mode is set to the reproduction mode, whether the moving image file of the second sequential images corresponding to the moving image file of the first sequential images recorded in the image recording unit 14 of the master camera is recorded in the image recording units 24 and 34 of the slave cameras is judged by the recording start time and the recording end time of the reproduction file. Therefore, in contrast with the previous first embodiment, the master camera and the slave cameras do not always need to perform imaging in cooperation as in the first embodiment. That is, as long as the internal clocks are synchronized, it is possible to generate one connection file by using the second sequential images in the slave cameras generated in a period corresponding to at least part of the period in which the first sequential images are generated in the master camera, after imaging has been performed in the master camera and the slave cameras.

It should be understood that the operation in which the user of the master camera starts the recording of the second sequential images in the slave cameras at a given timing as in the present fourth embodiment is applicable to the previous second and third embodiments.

In the first, third, and fourth embodiments described above, the composing unit 111 of the controller unit 11 creates a combination photograph from the through-images. The composing unit 111 may create a combination photograph from the frame images in the first and second sequential images. In this case, the controller unit 11 of the master camera has only to execute the combination photograph generation subroutine in step S115 as shown in FIG. 18.

That is, in the first embodiment described above, as shown in FIG. 10, the controller unit 11 records, as a still image file in the image recording unit 14, the combination photograph in which the through-images are superimposed or laid out by the composing unit 111, in step S115D. In contrast, according to the present modification, step S115D is omitted as shown in FIG. 18. Instead, in step S115B, the controller unit 11 suspends the display of the through-image in the camera (selected camera) in the selected window, and then records a touch time, a selected camera name, a display delay value, and a file name in a combination photograph information file 172 which is a backdating tag formed in the storage unit 17 as shown in FIG. 19 in step S115G. Here, the touch time is the time at which a touch is performed. The selected camera name is information that identifies the selected camera. The display delay value is the display delay value of the selected camera updated and stored in the storage unit 17 in steps S107 and S108. The file name is information that identifies the moving image file of the sequential images being recorded by the selected camera. An actual combination photograph is created after the controller unit 11 of the master camera has obtained the frame images in the second sequential images corresponding to the selected through-images in the moving image connection subroutine performed by the controller unit 11 of the master camera in step S119. That is, as shown in FIG. 20, the controller unit 11 generates one connection file by the composing unit 111 in step S119H. After this (or before step S119H), in step S119I, the controller unit 11 generates one combination photograph by the composing unit 111 using the combination photograph information file 172 which is the backdating tag stored in the storage unit 17, and the frame images in the moving images in the master camera, i.e., in the first sequential images and the second sequential images recorded in the image recording unit 14.

Therefore, in the master camera, the operation unit 12 receives the specification for the still image recording timing for each through-image by the user based on the through-images in the master camera and the slave cameras displayed on the display unit 15. The composing unit 111 in the controller unit 11 of the master camera then forms one still image as images collected into one file by combining the first still image in the first sequential images by the specified first still image recording timing with the second still image in the second sequential images by the specified second still image recording timing. Consequently, a combination photograph can be created.

The present invention is not limited to the techniques described above in the embodiments, and various modifications can be made at the stage of carrying out the invention without departing from the sprit thereof.

For example, although the image acquisition apparatus 10 functions as the master camera and the image acquisition apparatuses 20 and 30 function as the slave cameras in the embodiments described by way of example, any one of the image acquisition apparatuses 10, 20, and 30 may function as the master camera.

In the techniques described in the embodiments, the control mainly described with reference to the flowcharts can be carried out by the use of a program. This program can be non-transitorily stored in a computer-readable recording medium or a computer-readable recording unit. There are various ways of recording a program in the recording medium or the recording unit. The program may be recorded at the time of product shipment, may be recorded by the use of a distributed recording medium, or may be recorded by the use of downloading via the Internet.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image acquisition apparatus cooperating with at least one other image acquisition apparatus to generate a moving image connection file with multiple points of view, the image acquisition apparatus comprising:
    an imager unit configured to generate first sequential images by imaging;
    a communication unit configured to receive, from the at least another image acquisition apparatus, (1) through images that correspond to second sequential images generated by imaging at the other image acquisition apparatus, (2) range specifying sequential images that respectively correspond to a temporal part of the second sequential images generated by the imaging at the other image acquisition apparatus and that are smaller in communication amount than the second sequential images, and (3) display delay metadata;
    a display unit configured to display first display images corresponding to the first sequential images simultaneously with second display images corresponding to the through images that correspond to the second sequential images received by the communication unit;
    an operation unit configured to receive a user input on the second display images displayed on the display unit, the user input specifying a start of the temporal part of the second sequential images corresponding to the range specifying sequential images; and
    a controller unit configured to (1) cause the communication unit to receive the range specifying sequential images from the other image acquisition apparatus, and (2) generate the moving image connection file including both (1) at least some of the first sequential images and (2) the range specifying sequential images, wherein the range specifying sequential images within the moving image connection file are related temporally to the first sequential images within the moving image connection file using the display delay meta data, and wherein the moving image connection file includes both a first point of view corresponding to that of the imager unit and a second point of view corresponding to that of the other image acquisition apparatus.

2. The apparatus according to claim 1, wherein
the controller unit is configured to request the other image acquisition apparatus to send the temporal part of the second sequential images corresponding to the specified range so that the communication unit only receives the second sequential images in the specified range.

3. The apparatus according to claim 1, further comprising:
a recording unit configured to record the first sequential images; and
an image composing unit configured to create images collected into the moving image connection file by using the recorded first sequential images and the temporal part of the received second sequential images corresponding to the specified range.

4. The apparatus according to claim 3, wherein
the image composing unit is configured to use the temporal part of the received second sequential images corresponding to the specified range in consideration of the received display delay metadata, the display delay metadata quantifying a delay from the imaging in the other image acquisition apparatus to the display of the second display image in the display unit of this image acquisition apparatus.

5. The apparatus according to claim 3, further comprising:
a sending unit configured to send a request to generate the second sequential images to at least the other image acquisition apparatus in response to the generation of the first sequential images in the imager unit.

6. The apparatus according to claim 3, wherein
the second sequential images are images generated in a period corresponding to at least part of the period in which the first sequential images are generated in the imager unit.

7. The apparatus according to claim 6, further comprising:
a sending unit configured to send, to at least the other image acquisition apparatus in response to the display of the first sequential images in the display unit, a request corresponding to the timing of the display to send the range specifying sequential images.

8. The apparatus according to claim 3, wherein
the image composing unit is configured to create sequential images as images collected into the moving image connection file by replacing a part of the first sequential images corresponding to the specified range with the range specifying sequential images.

9. The apparatus according to claim 8, wherein
the operation unit is further configured to receive specified first and second still image recording timings in the first and second display images specified by a further user operation based on the first and second display images displayed on the display unit, and
the image composing unit is further configured to create one still image by combining the first display image at the specified first still image recording timing with the second display image at the specified second still image recording timing.

10. The apparatus according to claim 3, wherein
the operation unit is further configured to receive specified first and second still image recording timings in the first and second display images specified by a further user operation based on the first and second display images displayed on the display unit, and
the image composing unit is further configured to create one still image as images collected into one file by combining a first still image in the first sequential images at the specified first still image recording timing with a second still image in the second sequential images at the specified second still image recording timing.

11. The apparatus according to claim 1, wherein
the range specifying sequential images received by the communication unit include reduced rate sequential images which are formed by extracting the sequential images in every $n^{th}$ predetermined frame, where n is an integer greater than 1.

12. The apparatus according to claim 11, wherein
the sequential images received by the communication unit only include frame images which are not received as the reduced-rate sequential images.

13. An image acquisition apparatus comprising:
a communication unit configured to communicate with another image acquisition apparatus to which the image acquisition apparatus is slaved;
an imager unit configured to generate sequential images by imaging;
a recording unit configured to record the sequential images; and
a controller unit configured to
generate range specifying sequential images that correspond to a temporal part of the sequential images recorded in the recording unit and that are smaller in communication amount than the sequential images recorded in the recording unit, in response to a request to send the range specifying sequential images from the other image acquisition apparatus, and then send
(1) the range specifying sequential images and
(2) display delay metadata which quantifies a delay from the imaging by the imager unit to the display of at least some of the sequential images in a display unit of the other image acquisition apparatus
to the other image acquisition apparatus by the communication unit
in response to a request to send the sequential images from the other image acquisition apparatus.

14. A method for controlling an image acquisition apparatus cooperating with at least one other image acquisition apparatus to generate a moving image connection file with multiple points of view, the method comprising:
generating first sequential images by imaging;
receiving, from the at least another image acquisition apparatus, (1) through images that correspond to second sequential images generated by imaging at the other image acquisition apparatus, (2) range specifying sequential images that respectively correspond to a temporal part of the second sequential images generated by the imaging at the other image acquisition apparatus and that are smaller in communication amount than the second sequential images, and (3) display delay metadata;
displaying first display images corresponding to the first sequential images simultaneously with second display images corresponding to the through images that correspond to the second sequential images;
receiving a specified range which is a range in the second live-view through images specified by a user operation based on displayed display images;
receiving a user input on the second display images displayed on the display unit, the user input specifying a start of the temporal part of the second sequential images corresponding to the range specifying sequential images; and
generating the moving image connection file including (1) at least some of the first sequential images and (2) the range specifying sequential images, wherein the range specifying sequential images within the moving image connection file are related temporally to the first sequential images within the moving image connection file using the display delay meta data, and wherein the moving image connection file includes both a first point of view corresponding to that of the image acquisition apparatus and a second point of view corresponding to that of the other image acquisition apparatus.

15. A method for controlling an image acquisition apparatus, the method comprising:
generating sequential images by imaging;
recording the sequential images;
receiving a request to send range specifying sequential images from another image acquisition apparatus to which the image acquisition apparatus is slaved;
generating range specifying sequential images that correspond to a temporal part of the sequential images recorded and that are smaller in communication amount than the sequential images recorded, in response to a request from the other image acquisition apparatus to send the range specifying sequential images from the image acquisition apparatus to the other image acquisition apparatus, and then sending
(1) the range specifying sequential images and
(2) display delay metadata which quantifies a delay from the imaging by the imager unit to the display of at least some of the sequential images in a display unit of the other image acquisition apparatus
to the other image acquisition apparatus responsive to receiving a request to send the sequential images from the other image acquisition apparatus.

16. A computer-readable recording medium non-transitorily storing a program which allows a computer of an image acquisition apparatus to cooperate with at least one other image acquisition apparatus to generate a moving image connection file with multiple points of view, by causing the computer to:
generate first sequential images by imaging;
receive, from the at least another image acquisition apparatus, (1) through images that correspond to second sequential images generated by imaging at the other image acquisition apparatus, (2) range specifying sequential images that respectively correspond to a temporal part of the second sequential images generated by the imaging at the other image acquisition apparatus and that are smaller in communication amount than the second sequential images, and (3) display delay metadata;
display first display images corresponding to the first sequential images simultaneously with second display images corresponding to the through images that correspond to the second sequential images;

receive a specified range which is a range in the second live-view through images specified by a user operation based on displayed display images;

receive a user input on the second display images displayed on the display unit, the user input received specifying a start of the temporal part of the second sequential images corresponding to the range specifying sequential images; and generate the moving image connection file including (1) at least some of the first sequential images and (2) the range specifying sequential images, wherein the range specifying sequential images within the moving image connection file are related temporally to the first sequential images within the moving image connection file using the display delay meta data, and wherein the moving image connection file includes both a first point of view corresponding to that of the image acquisition apparatus and a second point of view corresponding to that of the other image acquisition apparatus.

17. A computer-readable recording medium non-transitorily storing a program which allows a computer of an image acquisition apparatus to cooperate with at least one other image acquisition apparatus to generate a moving image connection file with multiple points of view, by causing the computer to:

generate sequential images by imaging;

record the sequential images;

receive a request to send range specifying sequential images from another image acquisition apparatus to which the image acquisition apparatus is slaved;

generate range specifying sequential images that correspond to a temporal part of the sequential images recorded and that are smaller in communication amount than the sequential images recorded, in response to a request from the other image acquisition apparatus to send the range specifying sequential images from the image acquisition apparatus to the other image acquisition apparatus, and then send (1) the range specifying sequential images and
(2) display delay metadata which quantifies a delay from the imaging by the imager unit to the display of at least some of the sequential images in a display unit of the other image acquisition apparatus to the other image acquisition apparatus responsive to receiving a request to send the sequential images from the other image acquisition apparatus.

18. An image acquisition system comprising:

a master image acquisition apparatus comprising a first imager unit configured to generate first sequential images by imaging with a first point of view, a first communication unit, a display unit, an operation unit, and a first controller unit; and a slave image acquisition apparatus comprising a second imager unit configured to generate second sequential images by imaging with a second point of view different from the first point of view, a recording unit configured to record the second sequential images, and a second controller unit, wherein the first communication unit of the master image acquisition apparatus is configured to receive, from the slave image acquisition apparatus, through images that correspond to the second sequential images, the display unit of the master image acquisition unit is configured to display, simultaneously, (1) first display images corresponding to the first sequential images and (2) second display images corresponding to the received through images that correspond to the second sequential images, the operation unit of the master image acquisition unit is configured to receive a user input on the second display images displayed on the display unit, the user input received specifying a start of a temporal part of the second sequential images defining range specifying sequential images, the first communication unit of the master image acquisition apparatus is configured to send to the slave image acquisition apparatus, a request responsive to the received user input, the second communication unit of the slave image acquisition apparatus is configured to receive the request from the master image acquisition unit, the second controller unit of the slave image acquisition apparatus is configured to generate the range specifying sequential images responsive to receipt of the request by the second communication unit, the second communication unit of the slave image acquisition apparatus is configured to send (1) the generated range specifying sequential images and (2) display delay metadata to the master image acquisition unit, and the first controller unit of the master image acquisition apparatus is configured to generate a moving image connection file including at least some of the first sequential images and the range specifying sequential images, wherein the range specifying sequential images within the moving image connection file are related temporally to the first sequential images within the moving image connection file using the display delay metadata.

* * * * *